United States Patent  (10) Patent No.: US 12,500,662 B2
Miller et al.  (45) Date of Patent: Dec. 16, 2025

(54) MULTI-STATIC SYNTHETIC APERTURE RADAR USING LOW EARTH ORBIT COLLECTION

(71) Applicant: Viasat Inc., Carlsbad, CA (US)

(72) Inventors: Craig A. Miller, Carlsbad, CA (US); David D. Greenidge, Longmont, CO (US); Kenneth V. Buer, Bluff City, TN (US); David J. Hancharik, Norcross, GA (US)

(73) Assignee: Viasat, Inc., Carlsbad, CA (US)

( * ) Notice: Subject to any disclaimer, the term of this patent is extended or adjusted under 35 U.S.C. 154(b) by 290 days.

(21) Appl. No.: 18/036,117

(22) PCT Filed: Nov. 13, 2020

(86) PCT No.: PCT/US2020/060602
§ 371 (c)(1),
(2) Date: May 9, 2023

(87) PCT Pub. No.: WO2022/103403
PCT Pub. Date: May 19, 2022

(65) Prior Publication Data
US 2023/0412252 A1 Dec. 21, 2023

(51) Int. Cl.
H04B 7/185 (2006.01)
G01S 13/90 (2006.01)
H04B 7/06 (2006.01)

(52) U.S. Cl.
CPC .......... *H04B 7/18513* (2013.01); *G01S 13/90* (2013.01); *H04B 7/0617* (2013.01); *H04B 7/18547* (2013.01)

(58) Field of Classification Search
CPC .. H04B 7/18513; H04B 7/1851; H04B 7/185; H04B 7/18519; H04B 7/18515;
(Continued)

(56) References Cited

U.S. PATENT DOCUMENTS 4,602,257 A 7/1986 Grisham
6,388,606 B1 5/2002 Keydel et al.
(Continued)

FOREIGN PATENT DOCUMENTS

FR 2800215 A1 * 4/2001 ........... H04B 7/2041
KR 1020200125677 4/2020
(Continued)

OTHER PUBLICATIONS

International Search Report and Written Opinion, PCT/US2020/060602 dated Aug. 18, 2021.

*Primary Examiner* — Keith Ferguson
(74) *Attorney, Agent, or Firm* — Holland & Hart LLP

(57) ABSTRACT

A multi-static synthetic aperture radar using beamformed illumination beams and multiple collection satellites is described. An illumination satellite may be in first orbit and multiple collection satellites may be in a second orbit. The illumination satellite may transmit beam signals (e.g., communication signals carrying modulated data to user terminals) from an antenna array to different beam coverage areas according to a beamforming matrix. Each of the collection satellites may receive reflections of the beam signals. The reflected signals received at the collection satellites may be processed according to the beam signals and beamforming matrix used to transmit the beam signals to obtain an image of a geographical area. In some cases, the collection satellites may relay the received signals for processing via the illumination satellite.

18 Claims, 10 Drawing Sheets

(58) Field of Classification Search
CPC .............. H04B 7/18523; H04B 7/0617; H04B 7/18547; H04B 7/18554; G01S 13/90; G01S 13/9004; G01S 13/9005; G01S 13/9011; G01S 13/9017
See application file for complete search history.

(56) References Cited

U.S. PATENT DOCUMENTS

| | | |
|---|---|---|
| 6,677,884 B2 | 1/2004 | Moreira et al. |
| 7,486,224 B2 | 2/2009 | Ghaleb et al. |
| 7,633,427 B2 | 12/2009 | Nelson |
| 7,911,372 B2 | 3/2011 | Nelson |
| 9,869,763 B2 | 1/2018 | Calabrese |
| 9,973,266 B1 | 5/2018 | Avellan et al. |
| 10,574,338 B1 | 2/2020 | Chang |
| 2007/0090990 A1 | 4/2007 | Nelson |
| 2010/0045512 A1 | 2/2010 | Nelson |
| 2015/0378018 A1 | 12/2015 | Calabrese |
| 2017/0285178 A1* | 10/2017 | Platzer .................... G01S 19/45 |
| 2019/0101639 A1 | 4/2019 | Rincon et al. |

FOREIGN PATENT DOCUMENTS

| | | |
|---|---|---|
| KR | 1020200084996 | 7/2020 |
| WO | WO 2019/173149 A1 | 9/2019 |

* cited by examiner

MULTI-STATIC SYNTHETIC APERTURE RADAR USING LOW EARTH ORBIT COLLECTION

CROSS REFERENCE

The present application for patent is a 371 national stage filing of International Patent Application No. PCT/US2020/60602 by MILLER et al., entitled "MULTI-STATIC SYNTHETIC APERTURE RADAR USING LOW EARTH ORBIT COLLECTION" filed Nov. 13, 2020, which is assigned to the assignee hereof and is expressly incorporated by reference in its entirety herein.

BACKGROUND

The following relates generally to multi-orbit satellite systems and more specifically to multi-static synthetic aperture radar using low earth orbit collection. Synthetic aperture radar may be used to improve spatial resolution by combining signals associated with multiple locations of the radar illuminator or receiver. Uses of synthetic aperture radar include scientific or environmental monitoring, and surveillance of movements of objects of interest for asset or military intelligence.

SUMMARY

The described techniques relate to improved methods, systems, devices, and apparatuses that support multi-static synthetic aperture radar using low earth orbit collection. In some examples, an illumination satellite may be in first orbit and multiple collection satellites may be in a second orbit. The illumination satellite may transmit beamformed illumination signals such as beamformed communication signals to different beam coverage areas. Each of the collection satellites may receive reflections of the beamformed illumination signals. The reflected signals received at the collection satellites may be processed taking into account the beamforming matrix used to transmit the beamformed illumination signals to obtain an image of a geographical area. In some cases, the beamformed illumination signals may carry communication signals (e.g., modulated data) intended for user terminals in the coverage areas. In some cases, the collection satellites may relay the received signals for processing via the illumination satellite.

DETAILED DESCRIPTION

Figure 1:
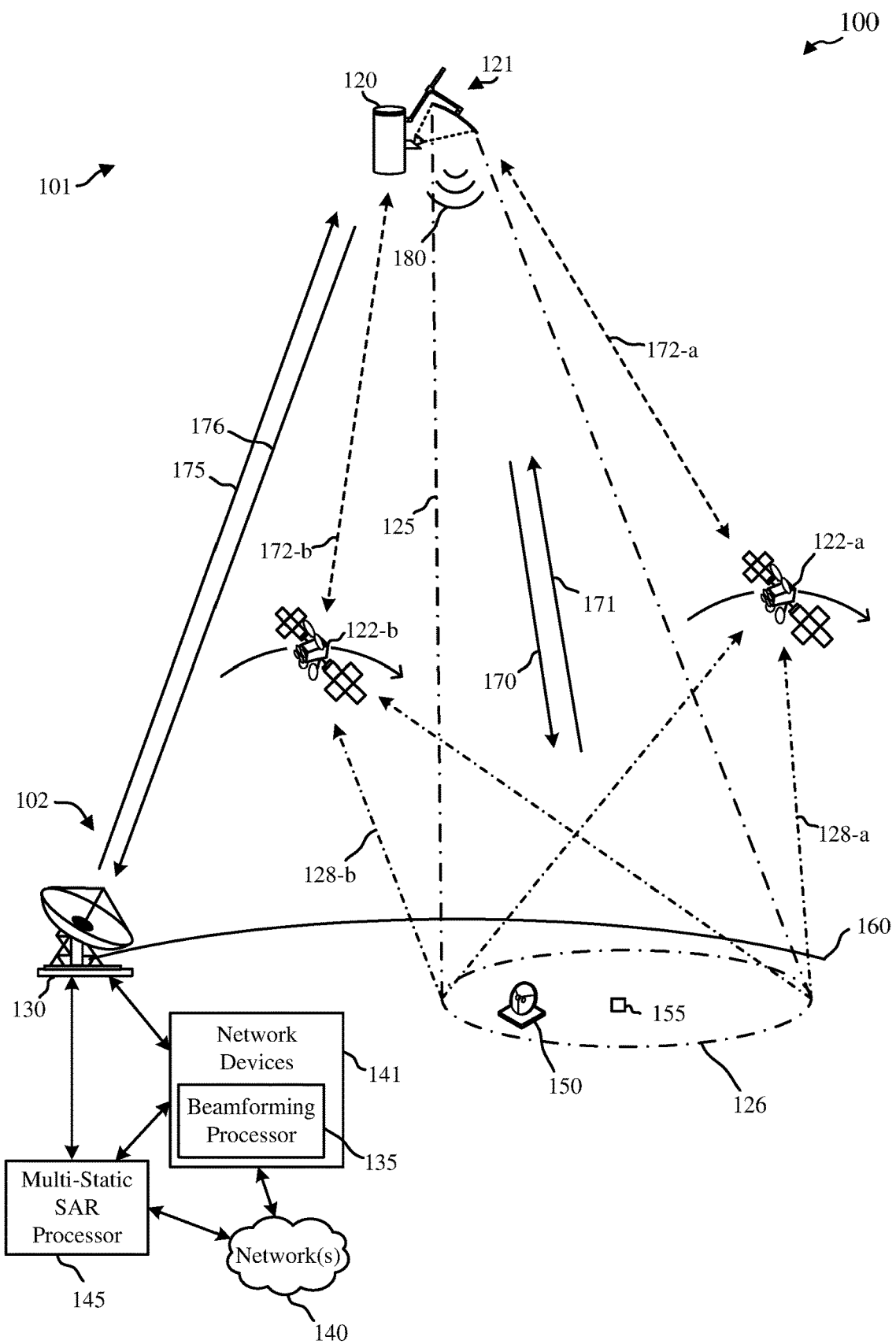
FIG. 1 shows a diagram of a satellite system that supports multi-static synthetic aperture radar using low earth orbit collection in accordance with examples as disclosed herein.

A system in accordance with the techniques described herein may support various examples of multi-static synthetic aperture radar using low earth orbit collection. In some cases, a communications satellite may be employed as an illumination source for a multi-static synthetic aperture radar. The communications satellite may, for example, be in a geostationary orbit, and may operate in a multiple spot beam mode, transmitting or receiving according to a number of relatively narrow spot beams directed at different regions of the earth. A satellite system including the illumination satellite may employ on-board beamforming on the satellite, ground-based beamforming, or end-to-end beamforming.

The satellite system may include a number of collection satellites, which may be in a different orbit (e.g., low earth orbit) than the illumination satellite. The illumination signals transmitted by the illumination satellite may reflect off the surface of the earth including objects or other features and be received by the collection satellites in a multi-static configuration. The collection satellites may transmit the information (e.g., digital samples) from the received signals to one or more ground stations (e.g., directly or via one or more other satellites such as the illumination satellite). An aperture for imaging the received signals may be defined by a quantity of collection satellites receiving signals reflected in multiple directions including the spatial relationship between the collection satellites and the relative movement of the collection satellites relative to the illuminated region and position of the illumination satellite. Multi-static data from multiple sampled signals (e.g., representing multiple beam signals) from each of multiple collection satellites representing reflected signals for a same time period may be used to determine geospatial information over an aperture related to the dimensions of the positions of the collection satellites. The multi-static aperture may be combined with a synthesized aperture for each of the illumination sources (e.g., as the collection satellites traverse their orbital paths).

Imagery for the region (e.g., including one or more beam coverage areas) may be obtained from the reflected signals and beam information (e.g., beam coefficients, beam signals).

This description provides various examples of techniques for multi-static synthetic aperture radar using low earth orbit collection, and such examples are not a limitation of the scope, applicability, or configuration of examples in accordance with the principles described herein. Rather, the ensuing description will provide those skilled in the art with an enabling description for implementing embodiments of the principles described herein. Various changes may be made in the function and arrangement of elements.

Thus, various embodiments in accordance with the examples disclosed herein may omit, substitute, or add various procedures or components as appropriate. For instance, it should be appreciated that the methods may be performed in an order different than that described, and that various steps may be added, omitted or combined. Also, aspects and elements described with respect to certain examples may be combined in various other examples. It should also be appreciated that the following systems, methods, devices, and software may individually or collectively be components of a larger system, wherein other procedures may take precedence over or otherwise modify their application.

FIG. 1 shows a diagram of a satellite system 100 that supports multi-static synthetic aperture radar using low earth orbit collection in accordance with examples as disclosed herein. Satellite system 100 may use a number of network architectures including a space segment 101 and ground segment 102. The space segment 101 may include one or more satellites 120. The ground segment 102 may include one or more access node terminals 130 (e.g., gateway terminals, ground stations), as well as other central processing centers or devices such as network operations centers (NOCs) or satellite and gateway terminal command centers (not shown). In some examples, the ground segment 102 may also include user terminals 150 that are provided a communications service via a satellite 120.

In various examples, a satellite 120 may be configured to support wireless communication between one or more access node terminals 130 and/or various user terminals 150 located in a service coverage area, which, in some examples, may be a primary task or mission of the satellite 120. In some examples, the satellite 120 may be deployed in a geostationary orbit (GEO), such that its orbital position with respect to terrestrial devices is relatively fixed, or fixed within an operational tolerance or other orbital window (e.g., within an orbital slot). In other examples, the satellite 120 may operate in any appropriate orbit (e.g., low Earth orbit (LEO), medium Earth orbit (MEO), etc.).

The satellite 120 may use an antenna assembly 121, such as a phased array antenna assembly (e.g., direct radiating array (DRA)), a phased array fed reflector (PAFR) antenna, or any other mechanism known in the art for reception or transmission of signals (e.g., of a communications or broadcast service, or a data collection service). When supporting a communications service, the satellite 120 may receive forward uplink signals 175 from access node terminals 130 and transmit forward downlink signals 170 to one or more user terminals 150. The satellite 120 may also receive return uplink signals 171 from one or more user terminals 150 and transmit return downlink signals 176 to one or more access node terminals 130. A variety of physical layer transmission modulation and coding techniques may be used by the satellite 120 for the communication of signals between access node terminals 130 or user terminals 150 (e.g., adaptive coding and modulation (ACM)).

The antenna assembly 121 may support communication or other signal reception via one or more beamformed spot beams 125, which may be otherwise referred to as service beams, satellite beams, or any other suitable terminology. Signals may be passed via the antenna assembly 121 in accordance with a spatial electromagnetic radiation pattern of the spot beams 125. When supporting a communications service, a spot beam 125 may use a single carrier, such as one frequency or a contiguous frequency range, which may also be associated with a single polarization. In some examples, the spot beam 125 may be referred to as a user spot beam or a user beam. For example, a user spot beam 125 may be configured to support one or more forward downlink signals 170 and/or one or more return uplink signals 171 between the satellite 120 and user terminals 150. Communication between the satellite 120 and the access node terminals 130 may be via access node spot beams (not shown), which may also be referred to as gateway beams.

A spot beam 125 may support a communications service between target devices (e.g., user terminals 150 and/or access node terminals 130), or other signal reception, within a spot beam coverage area 126. A spot beam coverage area 126 may be defined by an area of the electromagnetic radiation pattern of the associated spot beam 125, as projected on the ground or some other reference surface, having a signal power, signal-to-noise ratio (SNR), or signal-to-interference-plus-noise ratio (SINR) of spot beam 125 above a threshold (e.g., an absolute threshold or a threshold relative to the center of the beam). A spot beam coverage area 126 may cover any suitable service area (e.g., circular, elliptical, hexagonal, local, regional, national) and may support a communications service with any quantity of target devices located in the spot beam coverage area 126. In various examples, target devices such as airborne or underwater target devices may be located within a spot beam 125, but not located at the reference surface of a spot beam coverage area 126 (e.g., reference surface 160, which may be a terrestrial surface, a land surface, a surface of a body of water such as a lake or ocean, or a reference surface at an elevation or altitude).

Beamforming for a communication link may be performed by adjusting the signal phase (or time delay), and sometimes signal amplitude, of signals transmitted and/or received by multiple feed elements of one or more antenna assemblies 121 with overlapping native feed element patterns. In some examples, some or all feed elements may be arranged as an array of constituent receive and/or transmit feed elements that cooperate to enable various examples of on-board beamforming (OBBF), ground-based beamforming (GBBF), end-to-end beamforming, or other types of beamforming.

The satellite 120 may support multiple beamformed spot beams 125 covering respective spot beam coverage areas 126, each of which may or may not overlap with adjacent spot beam coverage areas 126. For example, the satellite 120 may support a service coverage area (e.g., a regional coverage area, a national coverage area, a hemispherical coverage area) formed by the combination of any number (e.g., tens, hundreds, thousands) of spot beam coverage areas 126. The satellite 120 may support a communications service by way of one or more frequency bands, and any number of subbands thereof. For example, the satellite 120 may support operations in the International Telecommunications Union (ITU) Ku, K, or Ka-bands, C-band, X-band, S-band, L-band, V-band, and the like.

In some examples, a service coverage area may be defined as a coverage area from which, and/or to which, either a terrestrial transmission source, or a terrestrial receiver may participate in (e.g., transmit and/or receive signals associated with) a communications service via the satellite 120, and may be defined by a plurality of spot beam coverage areas 126. In some systems, the service coverage area for each communications link (e.g., a forward uplink coverage area, a forward downlink coverage area, a return uplink coverage area, and/or a return downlink coverage area) may be different. While the service coverage area may only be active when the satellite 120 is in service (e.g., in a service orbit), the satellite 120 may have (e.g., be designed or configured to have) a native antenna pattern that is based on the physical components of the antenna assembly 121, and their relative positions. A native antenna pattern of the satellite 120 may refer to a distribution of energy with respect to an antenna assembly 121 of a satellite (e.g., energy transmitted from and/or received by the antenna assembly 121).

In some service coverage areas, adjacent spot beam coverage areas 126 may have some degree of overlap. In some examples, a multi-color (e.g., two, three or four-color re-use pattern) may be used, wherein a "color" refers to a combination of orthogonal communications resources (e.g., frequency resources, polarization, etc.). In an example of a four-color pattern, overlapping spot beam coverage areas 126 may each be assigned with one of the four colors, and each color may be allocated a unique combination of frequency (e.g., a frequency range or ranges, one or more channels) and/or signal polarization (e.g., a right-hand circular polarization (RHCP), a left-hand circular polarization (LHCP), etc.), or otherwise orthogonal resources. Assigning different colors to respective spot beam coverage areas 126 that have overlapping regions may reduce or eliminate interference between the spot beams 125 associated with those overlapping spot beam coverage areas 126 (e.g., by scheduling transmissions corresponding to respective spot beams according to respective colors, by filtering transmissions corresponding to respective spot beams according to respective colors). These combinations of frequency and antenna polarization may accordingly be re-used in the repeating non-overlapping "four-color" re-use pattern. In some examples, a communication service may be provided by using more or fewer colors. Additionally or alternatively, time sharing among spot beams 125 and/or other interference mitigation techniques may be used. For example, spot beams 125 may concurrently use the same resources (the same polarization and frequency range) with interference mitigated using mitigation techniques such as ACM, interference cancellation, space-time coding, and the like.

In some examples, a satellite 120 may be configured as a "bent pipe" satellite. In a bent pipe configuration, a satellite 120 may perform frequency and polarization conversion of the received carrier signals before re-transmission of the signals to their destination. In some examples, a satellite 120 may support a non-processed bent pipe architecture, with phased array antennas used to produce relatively small spot beams 125 (e.g., by way of GBBF). A satellite 120 may support K generic pathways, each of which may be allocated as a forward pathway or a return pathway at any instant of time. Relatively large reflectors may be illuminated by a phased array of antenna feed elements, supporting an ability to make various patterns of spot beams 125 within the constraints set by the size of the reflector and the number and placement of the antenna feed elements. Phased array fed reflectors may be employed for both receiving uplink signals, or transmitting downlink signals, or both.

A satellite 120 may operate in a multiple spot beam mode, transmitting or receiving according to a number of relatively narrow spot beams 125 directed at different regions of the earth. This may allow for segregation of user terminals 150 into the various narrow spot beams 125, or otherwise supporting a spatial separation of transmitted or received signals. In some examples, beamforming networks (BFN) associated with receive (Rx) or transmit (Tx) phased arrays may be dynamic, allowing for movement of the locations of Tx spot beams 125 (e.g., downlink spot beams 125) and Rx spot beams 125 (e.g., uplink spot beams 125).

User terminals 150 may include various devices configured to communicate signals with the satellite 120, which may include fixed terminals (e.g., ground-based stationary terminals) or mobile terminals such as terminals on boats, aircraft, ground-based vehicles, and the like. A user terminal 150 may communicate data and information via the satellite 120, which may include communications via an access node terminal 130 to a destination device such as a network device 141, or some other device or distributed server associated with a network 140. A user terminal 150 may communicate signals according to a variety of physical layer transmission modulation and coding techniques, including, for example, those defined by the Digital Video Broadcasting—Satellite—Second Generation (DVB-S2), Worldwide Interoperability for Microwave Access (WiMAX), cellular communication protocol such as Long-Term Evolution (LTE) or fifth generation (5G) protocol, or Data Over Cable Service Interface Specification (DOCSIS) standards.

An access node terminal 130 may service forward uplink signals 175 and return downlink signals 176 to and from satellite 120. Access node terminals 130 may also be known as ground stations, gateways, gateway terminals, or hubs. The access node terminal antenna system 131 may be two-way capable and designed with adequate transmit power and receive sensitivity to communicate reliably with the satellite 120. In some examples, access node terminals 130 may comprise a parabolic reflector with high directivity in the direction of a satellite 120 and low directivity in other directions. Access node terminals 130 may comprise a variety of alternative configurations and include operating features such as high isolation between orthogonal polarizations, high efficiency in the operational frequency bands, low noise, and the like.

When supporting a communications service, an access node terminal 130 may schedule traffic to user terminals 150. Alternatively, such scheduling may be performed in other parts of a satellite system 100 (e.g., at one or more network devices 141, which may include a NOC and/or gateway command center). Although one access node terminal 130 is shown in FIG. 1, examples in accordance with the present disclosure may be implemented in communications systems having multiple access node terminals 130, each of which may be coupled to each other and/or one or more networks 140 or network devices 141.

The satellite 120 may communicate with an access node terminal 130 by transmitting return downlink signals 176 and/or receiving forward uplink signals 175 via one or more access node spot beams. Access node spot beams may each be associated with a separate return feed of the antenna assembly 121 (e.g., GBBF), or each access node spot beam may be associated with multiple feeds of the antenna assembly 121 (e.g., OBBF or end-to-end beamforming).

An access node terminal 130 may provide an interface between the network 140 and the satellite 120 and, in some examples, may be configured to receive data and information directed between the network 140 and one or more user terminals 150. Access node terminal 130 may format the data and information for delivery to respective user terminals 150. Similarly, access node terminal 130 may be configured to receive signals from the satellite 120 (e.g., originating from one or more user terminals 150 and directed to a destination accessible via network 140). Access node terminal 130 may also format the received signals for transmission on network 140.

The network(s) 140 may be any type of network and can include, for example, the Internet, an internet protocol (IP) network, an intranet, a wide-area network (WAN), a metropolitan area network (MAN), a local-area network (LAN), a virtual private network (VPN), a virtual LAN (VLAN), a fiber optic network, a hybrid fiber-coax network, a cable network, a public switched telephone network (PSTN), a public switched data network (PSDN), a public land mobile network, and/or any other type of network supporting communications between devices as described herein. Network (s) 140 may include both wired and wireless connections as well as optical links. Network(s) 140 may connect the access node terminal 130 with other access node terminals that may be in communication with the same satellite 120 or with different satellites 120 or other vehicles.

One or more network device(s) 141 may be coupled with the access node terminals 130 and may control aspects of the satellite system 100. In various examples a network device 141 may be co-located or otherwise nearby the access node terminals 130, or may be a remote installation that communicates with the access node terminals 130 and/or network(s) 140 via wired and/or wireless communications link(s). Network devices 141 may include a beamforming processor 135, which may perform aspects related to generating coefficients for beamforming (e.g., for OBBF, GBBF, end-to-end beamforming) and applying the coefficients (e.g., for GBBF or end-to-end beamforming). For example, beamforming processor 135 may generate coefficients to be applied to beam signals, and may apply the coefficients to beam signals to obtain access node signals to be transmitted from one or more access node terminals 130, and may provide the access node signals to one or more access node terminals 130 for transmission.

The satellite 120 may be employed as an illumination source for a multi-static synthetic aperture radar. The satellite system 100 may also include one or more collection satellites 122 that are in a different orbit than satellite 120. For example, illumination satellite 120 may be a GEO satellite while collection satellites 122 may LEO or MEO satellites. The illumination signals transmitted by satellite 120 (e.g., forward downlink signals 170) may reflect off the surface 160 or objects 155 and be received by the collection satellites 122 in a multi-static configuration. That is, the same illumination signal (e.g., forward downlink signals 170) may be reflected and received at different angles by the collection satellites in different orbital slots that have concurrent fields of view that include one or more spot beam coverage areas 126. Thus, at each point and time each of the collection satellites 122 may sample the same signal reflected in different directions. In addition, the collection satellites 122 may sample the signal over multiple time instants. For example, as the collection satellites 122 traverse their orbital track, they may make several samples of signals (e.g., forward downlink signals 170) reflected from a given spot beam coverage area 126. Thus, an aperture for imaging the received signals may be defined by a quantity of collection satellites 122 performing samples of a signal reflected in multiple directions including the spatial relationship between the collection satellites 122 and the relative movement of the collection satellites 122 relative to the illuminated region (e.g., the given spot beam coverage area 126) and illumination satellite 120.

In some cases, the collection satellites 122 may transmit the information (e.g., digital samples) from the received signals to one or more ground stations. For example, the collection satellites 122 may transmit the information via satellite 120 to one or more access node terminals 130. In some cases, the collection satellites 122 may transmit the information in a communication link 172 associated with the communication service provided by satellite 120. In some cases, the signals transmitted by the collection satellites 122 in the communication link 172 may be used by the satellite 120 or access node terminals 130 to determine the position of the collection satellites 122. For example, the communication link 172 may be synchronized with the satellite 120 or include time stamp information, and the position of collection satellites 122 may be determined based on the timing information. In some cases, the position may be determined based on the timing information and a known orbit of the collection satellites 122.

In some examples, the satellite system 100 may include more than one satellite for illumination. For example, the satellite system 100 may include multiple GEO satellites, each transmitting spot beams 125, with some spot beams from each of the multiple GEO satellites at least partially overlapping. Multiple GEO satellites illuminating the same area may provide additional accuracy through temporal and spatial diversity. For example, a first illumination signal may be transmitted from a first GEO satellite and collected by each of multiple LEO collection satellites, and a second illumination signal may be transmitted from a second GEO satellite and collected by each of the multiple LEO collection satellites. Thus, cross-track interferometry may be used to improve range and azimuth accuracy due to the long baseline triangulation provided by multiple illumination and collection satellites. The larger effective aperture may provide higher accuracy than a synthesized aperture, and in addition may be combined with a synthesized aperture for each of the illumination sources (e.g., as the collection satellites traverse their orbital paths). Multiple illumination sources may also increase the effective cross-section of the scatter target due to the concurrent reception of multiple signals to different angles.

Use of the GEO satellite 120 for illumination may also provide other advantages. For example, a large amount of power (e.g., a kilowatt or more) may be used for transmission of synthetic radar aperture illumination signals. This may limit the duty cycle of a LEO satellite for transmission to short bursts or a fraction of its orbital period. In contrast, GEO communication satellites are generally much larger and designed for continuous operation. LEO collection satellites 122 that do not transmit illumination signals may thus be simpler and more economical to produce.

In some cases, the illumination satellite (e.g., GEO satellite 120) may transmit a reference signal (e.g., beacon signal) used for determining frequency, phase, or time of arrival for the signals received by the collection satellites 122. For example, GEO satellite 120 may transmit a beacon signal 180 over a wide area including over the service area having the beam coverage areas 126, and the collection satellites 122. In some cases, the collection satellites 122 may use the beacon signal 180 to determine frequency, phase, or time of arrival for the reflected beam signals 128. Additionally or alternatively, the collection satellites 122 may receive the forward downlink signals 170 (e.g., directly prior to being reflected) and use the forward downlink signals 170 as a reference for determining frequency, phase, or time of arrival for the reflected beam signals 128.

In some cases, beam signals 170 may be modulated to include timing and phase reference information. For example, beam signals 170 may include time stamps in each of multiple timing periods. Additionally or alternatively, beam signals 170 may include phase reference information such as phase reference symbols which may be used by the collection satellites 122 to match up the phase reference information in the beacon signal to provide phase information in the reflected signals.

In some cases, the collection satellites 122 may sample the reflected signals and send the sampled signals to multi-static SAR processor 145 for processing. The collection satellites 122 may transmit the sampled signals via the GEO satellite 120 to one or more access node terminals 130, which may pass the sampled signals to the network devices 141. For example, collection satellite 122-a may transmit the sampled signals in a return uplink of communication link 172-a and collection satellite 122-b may transmit the sampled signals in a return uplink of communication link 172-b. In some cases, satellite 120 may be an end-to-end relay, and thus multiple access node terminals 130 may each receive a composite signal of the sampled signals via respective subsets of transmit/receive paths of the GEO satellite 120. A beamforming processor 135 may combine the composite signals received at the multiple access node terminals 130 (e.g., according to a return beamforming matrix) to obtain the sampled signals from the collection satellite. The beamforming processor 135 may send the sampled signals to the multi-static SAR processor 145 for processing.

The multi-static SAR processor 145 may receive sampled signals from each of one or more collection satellites 122 for a given time period, and use the embedded timing and phase information (e.g., in combination with phase information from the collection satellite determined based on the beacon signal) and known beam signal information, to determine geospatial information for each reflected beam signal. The multi-static SAR processor 145 may synthesize multi-static data from multiple sampled signals (e.g., representing multiple beam signals) from each of multiple collection satellites representing reflected signals for a same time period to determine geospatial information over an aperture related to the dimensions of the positions of the collection satellites. In some examples, the multi-static SAR processor 145 may combine information from multiple collection satellites, multiple beam signals, and across time periods to obtain a multi-static and synthetic aperture for increased resolution and accuracy. Although shown as separate, multi-static SAR processor 145 may be included or co-located with network devices 141.

Figure 2A:
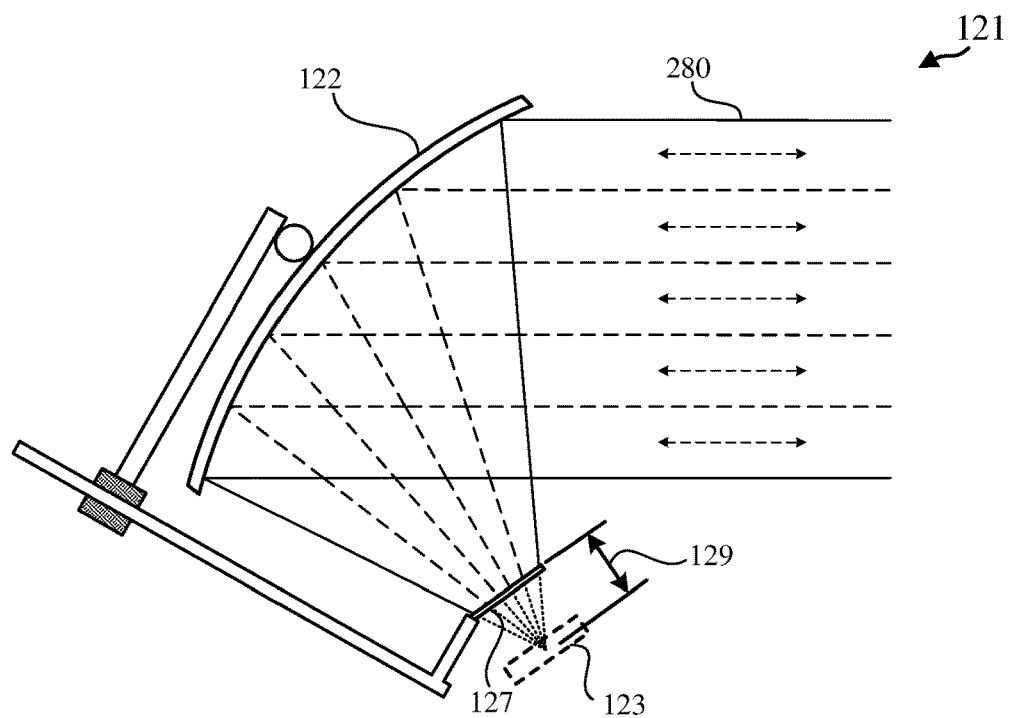
FIG. 2A illustrates an antenna assembly 121 of a satellite 120 that supports multistatic synthetic aperture radar using low earth orbit collection in accordance with examples as disclosed herein.

FIG. 2A illustrates an antenna assembly 121 of a satellite 120 that supports multi-static synthetic aperture radar using low earth orbit collection in accordance with examples as disclosed herein. As shown in FIG. 2A, the antenna assembly 121 may include a feed array assembly 127 and a reflector 122 that is shaped to have a focal region 123 where electromagnetic signals (e.g., inbound electromagnetic signals 280) are concentrated when received from a distant source. Similarly, a signal emitted by a feed array assembly 127 located at the focal region 123 will be reflected by reflector 122 into an outgoing plane wave (e.g., outbound electromagnetic signals 280). The feed array assembly 127 and the reflector 122 may be associated with a native antenna pattern formed by the composite of native feed element patterns for each of a plurality of feed elements 128 of the feed array assembly 127.

A satellite 120 may operate according to native antenna pattern of the antenna assembly 121 when the satellite 120 is in a service orbit, as described herein. The native antenna pattern may be based at least in part on a pattern of feed elements 128 of a feed array assembly 127, a relative position (e.g., a focal offset distance 129, or lack thereof in a focused position) of a feed array assembly 127 with respect to a reflector 122, etc. The native antenna pattern may be associated with a native antenna pattern coverage area. Antenna assemblies 121 described herein may be designed to support a particular service coverage area with the native antenna pattern coverage area of an antenna assembly 121, and various design characteristics may be determined computationally (e.g., by analysis or simulation) and/or measured experimentally (e.g., on an antenna test range or in actual use).

As shown in FIG. 2A, the feed array assembly 127 of the antenna assembly 121 is located between the reflector 122 and the focal region 123 of the reflector 122. Specifically, the feed array assembly 127 is located at a focal offset distance 129 from the focal region 123. Accordingly, the feed array assembly 127 of the antenna assembly 121 may be located at a defocused position with respect to the reflector 122. Although illustrated in FIG. 2A as a direct offset feed array assembly 127, a front feed array assembly 127 may be used, as well as other types of configurations, including the use of a secondary reflector (e.g., Cassegrain antenna, etc.), or a configuration without a reflector 122 (e.g., a DRA).

Figure 2B:
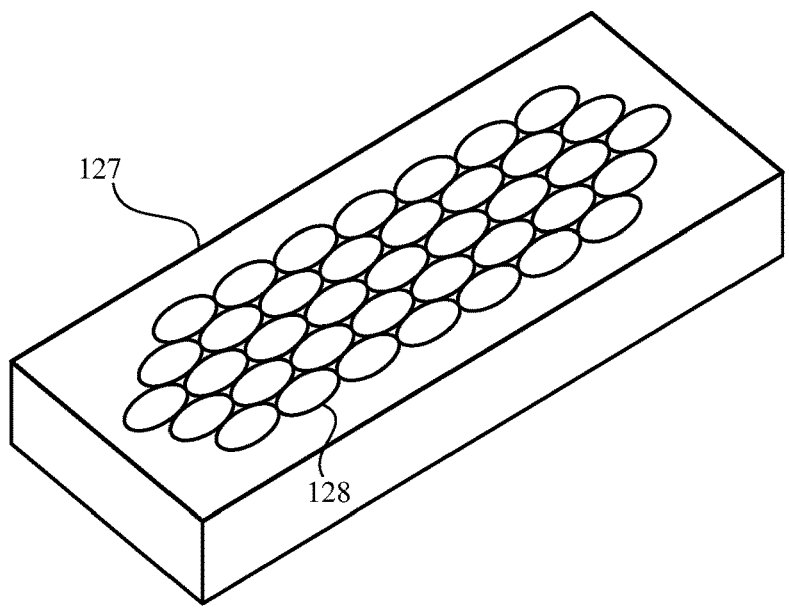
FIG. 2B illustrates a feed array assembly of an antenna assembly that supports multi-static synthetic aperture radar using low earth orbit collection in accordance with examples as disclosed herein.

FIG. 2B illustrates a feed array assembly 127 of an antenna assembly 121 that supports multi-static synthetic aperture radar using low earth orbit collection in accordance with examples as disclosed herein. As shown in FIG. 2B, the feed array assembly 127 may have multiple feed elements 128 for communicating signals (e.g., signals associated with a communications service, signals associated with a configuration or control of the satellite 120, received signals of a data collection or sensor arrangement).

As used herein, a feed element 128 may refer to a receive antenna element, a transmit antenna element, or an antenna element configured to support both transmitting and receiving (e.g., a transceiver element). A receive antenna element may include a physical transducer (e.g., a radio frequency (RF) transducer) that converts an electromagnetic signal to an electrical signal, and a transmit antenna element may include a physical transducer that emits an electromagnetic signal when excited by an electrical signal. The same physical transducer may be used for transmitting and receiving, in some cases.

Each of the feed elements 128 may include, for example, a feed horn, a polarization transducer (e.g., a septum polarized horn, which may function as two combined elements with different polarizations), a multi-port multi-band horn (e.g., dual-band 20 GHz/30 GHz with dual polarization LHCP/RHCP), a cavity-backed slot, an inverted-F, a slotted waveguide, a Vivaldi, a Helical, a loop, a patch, or any other configuration of an antenna element or combination of interconnected sub-elements. Each of the feed elements 128 may also include, or be otherwise coupled with an RF signal transducer, a low noise amplifier (LNA), or power amplifier (PA), and may be coupled with transponders in the satellite 120 that may perform other signal processing such as frequency conversion, beamforming processing, and the like.

A reflector 122 may be configured to reflect signals between the feed array assembly 127 and one or more target devices (e.g., user terminals 150, access node terminals 130) or objects (e.g., terrain features, vehicles, buildings, airborne objects). Each feed element 128 of the feed array assembly 127 may be associated with a respective native feed element pattern, which may be associated with a projected native feed element pattern coverage area (e.g., as projected on a terrestrial surface, plane, or volume after reflection from the reflector 122). The collection of the native feed element pattern coverage areas for a multi-feed antenna may be referred to as a native antenna pattern. A feed array assembly 127 may include any number of feed elements 128 (e.g., tens, hundreds, thousands, etc.), which may be arranged in any suitable arrangement (e.g., a linear array, an arcuate array, a planar array, a honeycomb array, a polyhedral array, a spherical array, an ellipsoidal array, or combinations thereof). Feed elements 128 may have ports or apertures having various shapes such as circular, elliptical, square, rectangular, hexagonal, and others.

FIGS. 3A, 3B, 4A, and 4B illustrate examples of antenna characteristics for an antenna assembly 121-a having a feed array assembly 127-a that supports multi-static synthetic aperture radar using low earth orbit collection in accordance with examples as disclosed herein. The antenna assembly 121-a may be operating in a condition that spreads received transmissions from a given location to a plurality of feed elements 128-a, or spreads transmitted power from a feed element 128-a over a relatively large area, or both.

Figure 3A:
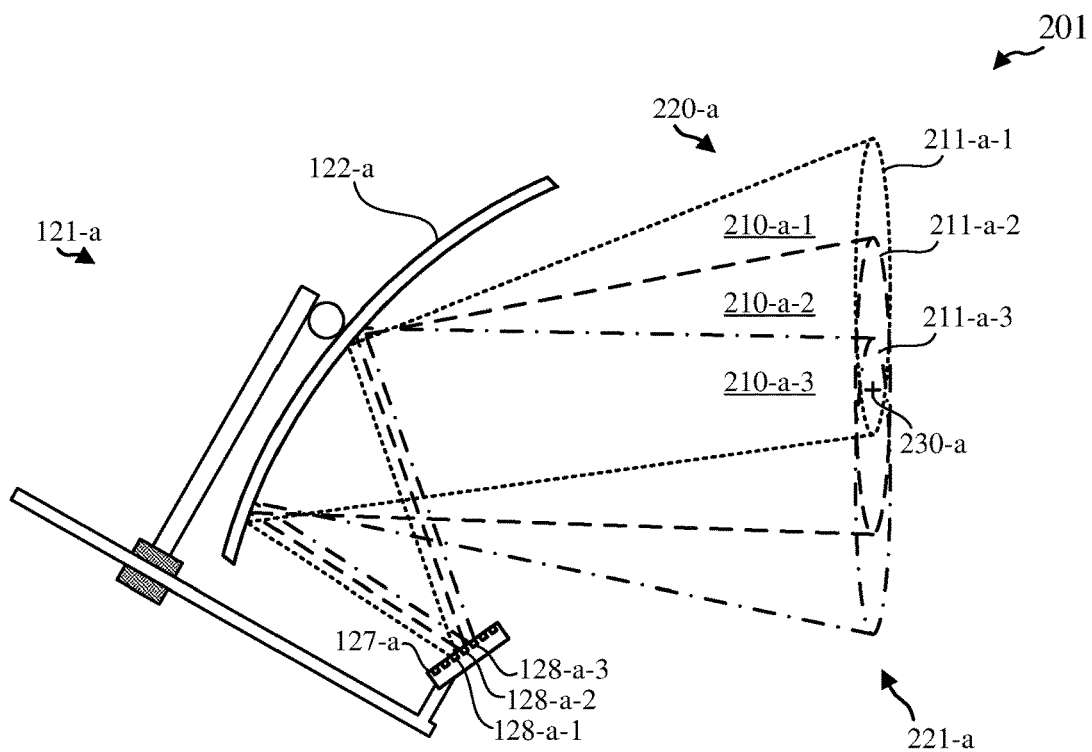
FIG. 3A shows a diagram of native feed element patterns associated with feed elements of the feed array assembly.

FIG. 3A shows a diagram 201 of native feed element patterns 210-a associated with feed elements 128-a of the feed array assembly 127-a. Specifically, diagram 201 illustrates native feed element patterns 210-a-1, 210-a-2, and 210-a-3, associated with feed elements 128-a-1, 128-a-2, and 128-a-3, respectively. The native feed element patterns 210-a may represent the spatial radiation pattern associated with each of the respective feed elements 128. For example, when feed element 128-a-2 is transmitting, transmitted electromagnetic signals may be reflected off the reflector 122-a, and propagate in a generally conical native feed element pattern 210-a-2 (although other shapes are possible depending on the characteristics of a feed element 128 and/or reflector 122). Although three native feed element patterns 210-a are shown for the antenna assembly 121-a, each of the feed elements 128 of an antenna assembly 121 is associated with a respective native feed element pattern 210. The composite of the native feed element patterns 210-a associated with the antenna assembly 121-a (e.g., native feed element patterns 210-a-1, 210-a-2, 210-a-2, and other native feed element patterns 210-a that are not illustrated) may be referred to as the native antenna pattern 220-a.

Each of the feed elements 128-a may also be associated with a native feed element pattern coverage area 211-a (e.g., native feed element pattern coverage areas 211-a-1, 211-a-2, and 211-a-3, associated with feed elements 128-a-1, 128-a-2, and 128-a-3, respectively), representing the projection of the native feed element patterns 210-a on a reference surface (e.g., a ground or water surface, a reference surface at an elevation, or some other reference plane or surface). A native feed element pattern coverage area 211 may represent an area in which various devices (e.g., access node terminals 130 and/or user terminals 150) may receive signals transmitted by a respective feed element 128. Additionally or alternatively, a native feed element pattern coverage area 211 may represent an area in which transmissions from various devices may be received by a respective feed element 128. For example, a device located at an area of interest 230-a, located within the native feed element pattern coverage areas 211-a-1, 211-a-2, and 211-a-3, may receive signals transmitted by feed elements 128-a-1, 128-a-2, and 128-a-3 and may have transmissions received by feed elements 128-a-1, 128-a-2, and 128-3-a. The composite of the native feed element pattern coverage areas 211-a associated with the antenna assembly 121-a (e.g., native feed element pattern coverage areas 211-a-1, 211-a-2, 211-a-2, and other native feed element pattern coverage areas 211-a that are not illustrated) may be referred to as the native antenna pattern coverage area 221-a.

The feed array assembly 127-a may be operating at a defocused position with respect to the reflector 122-a, such that the native feed element patterns 210-a, and thus the native feed element pattern coverage areas 211-a, are substantially overlapping. Therefore each position in the native antenna pattern coverage area 221-a may be associated with a plurality of feed elements 128, such that transmissions to a point of interest or receptions from a point of interest may employ a plurality of feed elements 128. It should be understood that diagram 201 is not drawn to scale and that native feed element pattern coverage areas 211 are generally each much larger than the reflector 122-a.

Figure 3B:
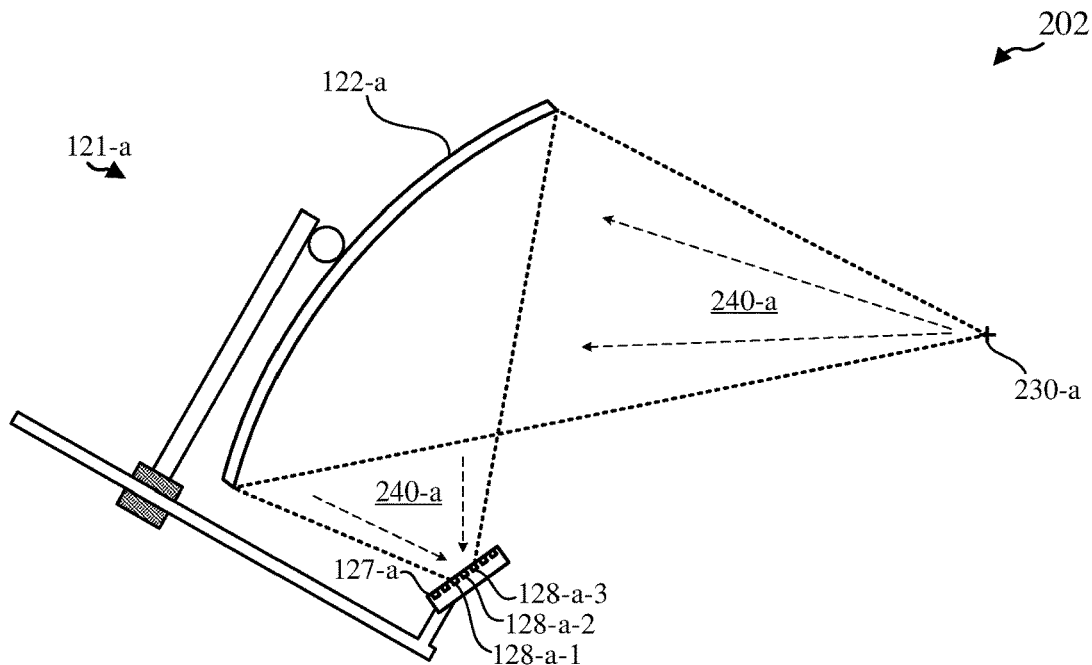
FIG. 3B shows a diagram illustrating signal reception of the antenna assembly for transmissions from the point of interest.

FIG. 3B shows a diagram 202 illustrating signal reception of the antenna assembly 121-a for transmissions 240-a from the point of interest 230-a. Transmissions 240-a from the point of interest 230-a may illuminate the entire reflector 122-a, or some portion of the reflector 122-a, and then be focused and directed toward the feed array assembly 127-a according to the shape of the reflector 122-a and the angle of incidence of the transmission 240 on the reflector 122-a. The feed array assembly 127-a may be operating at a defocused position with respect to the reflector 122-a, such that a transmission 240-a may be focused on a plurality of feed elements 128 (e.g., feed elements 128-a-1, 128-a-2, and 128-a-3, associated with the native feed element pattern coverage areas 211-a-1, 211-a-2, and 211-a-3, each of which contain the point of interest 230-b).

Figure 4A:
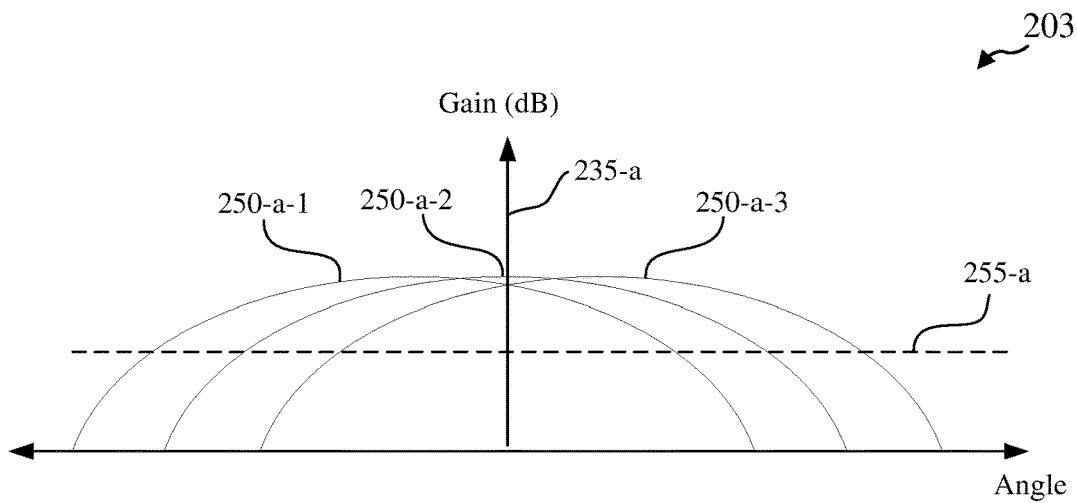
FIG. 4A shows a diagram of native feed element pattern gain profiles associated with three feed elements of the feed array assembly, with reference to angles measured from a zero offset angle.

FIG. 4A shows a diagram 203 of native feed element pattern gain profiles 250-a associated with three feed elements 128-a of the feed array assembly 127-a, with reference to angles measured from a zero offset angle 235-a. For example, native feed element pattern gain profiles 250-a-1, 250-a-2, and 250-a-3 may be associated with feed elements 128-a-1, 128-a-2, and 128-a-3, respectively, and therefore may represent the gain profiles of native feed element patterns 210-a-1, 210-a-2, and 210-a-3. As shown in diagram 203, the gain of each native feed element pattern gain profile 250 may attenuate at angles offset in either direction from the peak gain. In diagram 203, beam contour level 255-a may represent a desired gain level (e.g., to provide a desired information rate) to support a communications service or other reception or transmission service via the antenna assembly 121-a, which therefore may be used to define a boundary of respective native feed element pattern coverage areas 211-a (e.g., native feed element pattern coverage areas 211-a-1, 211-a-2, and 211-a-3). Beam contour level 255-a may represent, for example, a −1 dB, −2 dB, or −3 dB attenuation from the peak gain, or may be defined by an absolute signal strength, SNR level, or SINR level. Although three native feed element pattern gain profiles 250-a are shown, other native feed element pattern gain profiles 250-a may be associated with other feed elements 128-a.

As shown in diagram 203, each of the native feed element pattern gain profiles 250-a may intersect with another native feed element pattern gain profile 250-*a* for a substantial portion of the gain profile above the beam contour level 255-*a*. Accordingly, diagram 203 illustrates an arrangement of native feed element pattern gain profiles 250 where multiple feed elements 128 of a feed array assembly 127 may support signal communication at a particular angle (e.g., at a particular direction of the native antenna pattern 220-*a*). In some examples, this condition may be referred to as having feed elements 128 of a feed array assembly 127, or native feed element pattern coverage areas 211, having a high degree of overlap.

Figure 4B:
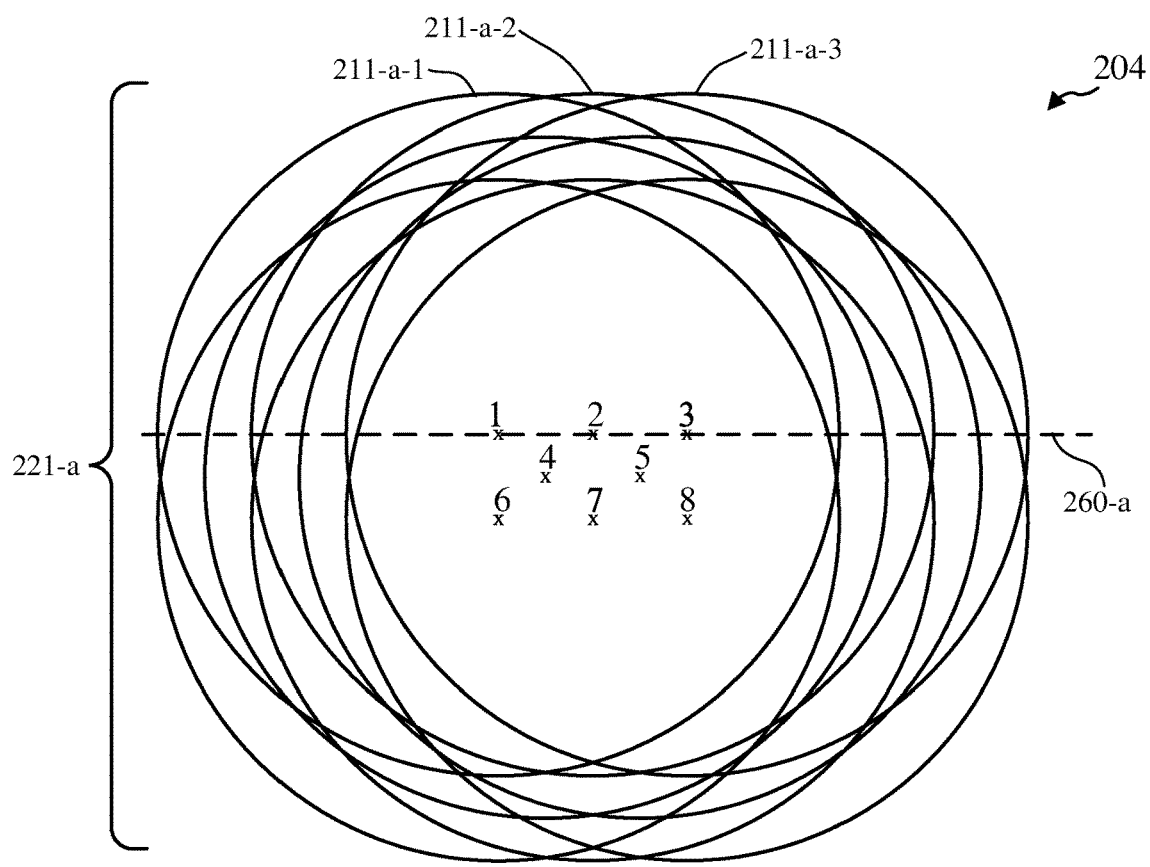
FIG. 4B shows a diagram illustrating a two-dimensional array of idealized native feed element pattern coverage areas of several feed elements of the feed array assembly.

FIG. 4B shows a diagram 204 illustrating a two-dimensional array of idealized native feed element pattern coverage areas 211 of several feed elements 128 of the feed array assembly 127-*a* (e.g., including feed elements 128-*a*-1, 128-*a*-2, and 128-*a*-3). The native feed element pattern coverage areas 211 may be illustrated with respect to reference surface (e.g., a plane at a distance from the communications satellite, a plane at some distance from the ground, a spherical surface at some elevation, a ground surface, etc.), and may additionally include a volume adjacent to the reference surface (e.g., a substantially conical volume between the reference surface and the communications satellite, a volume below the reference surface, etc.). The multiple native feed element pattern coverage areas 211-*a* may collectively form the native antenna pattern coverage area 221-*a*. Although eight native feed element pattern coverage areas 211-*a* are illustrated, a feed array assembly 127 may have any quantity of feed elements 128 (e.g., fewer than eight or more than eight), each associated with a native feed element pattern coverage area 211.

The boundaries of each native feed element pattern coverage area 211 may correspond to the respective native feed element pattern 210 at the beam contour level 255-*a*, and the peak gain of each native feed element pattern coverage area 211 may have a location designated with an 'x' (e.g., a nominal alignment or axis of a respective native feed element pattern 210 or native feed element pattern coverage area 211). Native feed element pattern coverage areas 211*a*-1, 211-*a*-2, and 211-*a*-3 may correspond to the projection of the native feed element patterns associated with native feed element pattern gain profiles 250-*a*-1, 250-*a*-2, and 250-*a*-3, respectively, where diagram 203 illustrates the native feed element pattern gain profiles 250 along section plane 260-*a* of diagram 204.

The native feed element pattern coverage areas 211 are referred to herein as idealized because the coverage areas are shown as circular for the sake of simplicity. However, in various examples a native feed element pattern coverage area 211 may be some shape other than a circle (e.g., an ellipse, a hexagon, a rectangle, etc.). Thus, tiled native feed element pattern coverage areas 211 may have more overlap with each other (e.g., more than three native feed element pattern coverage areas 211 may overlap, in some cases) than shown in diagram 204.

In diagram 204, which may represent a condition where the feed array assembly 127-*a* is located at a defocused position with respect to the reflector 122-*a*, a substantial portion (e.g., a majority) of each native feed element pattern coverage area 211 overlaps with an adjacent native feed element pattern coverage area 211. Locations within a service coverage area (e.g., a total coverage area of a plurality of spot beams of an antenna assembly 121) may be located within the native feed element pattern coverage area 211 of two or more feed elements 128. For example, the antenna assembly 121-*a* may be configured such that the area where more than two native feed element pattern coverage areas 211 overlap is maximized. In some examples, this condition may also be referred to as having feed elements 128 of a feed array assembly 127, or native feed element pattern coverage areas 211, having a high degree of overlap. Although eight native feed element pattern coverage areas 211 are illustrated, a feed array assembly 127 may have any quantity of feed elements 128, associated with native feed element pattern coverage areas 211 in a like manner.

In some cases, a single antenna assembly 121 may be used for transmitting and receiving signals between user terminals 150 or access node terminals 130. In other examples, a satellite 120 may include separate antenna assemblies 121 for receiving signals and transmitting signals. A receive antenna assembly 121 of a satellite 120 may be pointed at a same or similar service coverage area as a transmit antenna assembly 121 of the satellite 120. Thus, some native feed element pattern coverage areas 211 for antenna feed elements 128 configured for reception may naturally correspond to native feed element pattern coverage areas 211 for feed elements 128 configured for transmission. In these cases, the receive feed elements 128 may be mapped in a manner similar to their corresponding transmit feed elements 128 (e.g., with similar array patterns of different feed array assemblies 127, with similar wiring and/or circuit connections to signal processing hardware, similar software configurations and/or algorithms, etc.), yielding similar signal paths and processing for transmit and receive native feed element pattern coverage areas 211. In some cases, however, it may be advantageous to map receive feed elements 128 and transmit feed elements 128 in dissimilar manners.

A plurality of native feed element patterns 210 with a high degree of overlap may be combined by way of beamforming to provide one or more spot beams 125. Beamforming for a spot beam 125 may be performed by adjusting the signal phase or time delay, and/or signal amplitude, of signals transmitted and/or received by multiple feed elements 128 of one or more feed array assemblies 127 having overlapping native feed element pattern coverage areas 211. Such phase and/or amplitude adjustment may be referred to as applying beam weights (e.g., beamforming coefficients) to the feed element signals. For transmissions (e.g., from transmitting feed elements 128 of a feed array assembly 127), the relative phases, and sometimes amplitudes, of the signals to be transmitted are adjusted, so that the energy transmitted by feed elements 128 will constructively superpose at a desired location (e.g., at a location of a spot beam coverage area 126). For reception (e.g., by receiving feed elements 128 of a feed array assembly 127, etc.), the relative phases, and sometimes amplitudes, of the received signals are adjusted (e.g., by applying the same or different beam weights) so that the energy received from a desired location (e.g., at a location of a spot beam coverage area 126) by feed elements 128 will constructively superpose for a given spot beam coverage area 126.

The term beamforming may be used to refer to the application of the beam weights, whether for transmission, reception, or both. Computing beam weights or coefficients may involve direct or indirect discovery of communication channel characteristics. The processes of beam weight computation and beam weight application may be performed in the same or different system components. Adaptive beamformers may include a functionality that supports dynamically computing beam weights or coefficients.

Spot beams 125 may be steered, selectively formed, and/or otherwise reconfigured by applying different beam weights. For example, a quantity of active native feed element patterns 210 or spot beam coverage areas 126, a size of shape of spot beams 125, relative gain of native feed element patterns 210 and/or spot beams 125, and other parameters may be varied over time. Antenna assemblies 121 may apply beamforming to form relatively narrow spot beams 125, and may be able to form spot beams 125 having improved gain characteristics. Narrow spot beams 125 may allow the signals transmitted on one beam to be distinguished from signals transmitted on other spot beams 125 to avoid interference between transmitted or received signals, or to identify spatial separation of received signals, for example.

In some examples, narrow spot beams 125 may allow frequency and polarization to be re-used to a greater extent than when larger spot beams 125 are formed. For example, spot beams 125 that are narrowly formed may support signal communication via non-contiguous spot beam coverage areas 126 that are non-overlapping, while overlapping spot beams 125 can be made orthogonal in frequency, polarization, or time. In some examples, greater reuse by use of smaller spot beams 125 can increase the amount of data transmitted and/or received. Additionally or alternatively, beamforming may be used to provide sharper gain roll off at the beam edge which may allow for higher beam gain through a larger portion of a spot beam 125. Thus, beamforming techniques may be able to provide higher frequency reuse and/or greater system capacity for a given amount of system bandwidth.

Some satellites 120 may use OBBF to electronically steer signals transmitted and/or received via an array of feed elements 128 (e.g., applying beam weights to feed element signals at a satellite 120). For example, a satellite 120 may have a phased array multi-feed per beam (MFPB) on-board beamforming capability. In some examples, beam weights may be computed at a ground-based computation center (e.g., at an access node terminal 130, at a network device 141, at a communications service manager) and then transmitted to the satellite 120. In some examples, beam weights may be pre-configured or otherwise determined at a satellite 120 for on-board application.

In some cases, significant processing capability may be involved at a satellite 120 to control the phase and gain of each feed element 128 that is used to form spot beams 125. Such processing power may increase the complexity of a satellite 120. Thus, in some cases, a satellite 120 may operate with GBBF to reduce the complexity of the satellite 120 while still providing the advantage of electronically forming narrow spot beams 125. In some examples, beam weights or coefficients may be applied at a ground segment 102 (e.g., at one or more ground stations) before transmitting relevant signaling to the satellite 120, which may include multiplexing feed element signals at the ground segment 102 according to various time, frequency, or spatial multiplexing techniques, among other signal processing. The satellite 120 may accordingly receive and, in some cases, demultiplex such signaling, and transmit associated feed element signals via respective antenna feed elements 128 to form transmit spot beams 125 that are based at least in part on the beam weights applied at the ground segment 102. In some examples, a satellite 120 may receive feed element signals via respective antenna feed elements 128, and transmit the received feed element signals to a ground segment 102 (e.g., one or more ground stations), which may include multiplexing feed element signals at the satellite 120 according to various time, frequency, or spatial multiplexing techniques, among other signal processing. The ground segment 102 may accordingly receive and, in some cases, demultiplex such signaling, and apply beam weights to the received feed element signals to generate spot beam signals corresponding to respective spot beams 125.

In another example, a satellite system 100 in accordance with the present disclosure may support various end-to-end beamforming techniques, which may be associated with forming end-to-end spot beams 125 via a satellite 120 or other vehicle operating as an end-to-end relay. For example, satellite 120 may include multiple transmit/receive signal paths (e.g., transponders), each coupled between a receive feed element and a transmit feed element. In an end-to-end beamforming system, beam weights may be computed at a central processing system (CPS) (e.g., beamforming processor 135) of a ground segment 102, and end-to-end beam weights may be applied within the ground segment 102, rather than at a satellite 120. The signals within the end-to-end spot beams 125 may be transmitted and received at an array of access nodes terminals 130, which may be satellite access nodes (SANs). Any suitable type of end-to-end relay can be used in an end-to-end beamforming system, and different types of access node terminals 130 may be used to communicate with different types of end-to-end relays.

An end-to-end beamformer within a CPS may compute one set of end-to-end beam weights that accounts for: (1) the wireless signal uplink paths up to the end-to-end relay; (2) the transmit/receive signal paths through the end-to-end relay; and (3) the wireless signal downlink paths down from the end-to-end relay. The beam weights can be represented mathematically as a matrix. In some examples, OBBF and GBBF satellite systems may have beam weight vector dimensions set by the number of feed elements 128 on an antenna assembly 121. In contrast, end-to-end beam weight vectors may have dimensions set by the number of access node terminals 130, not the number of feed elements 128 on the end-to-end relay. In general, the number of access node terminals 130 is not the same as the number of feed elements 128 on the end-to-end relay. Further, the formed end-to-end spot beams 125 are not terminated at either transmit or receive feed elements 128 of the end-to-end relay. Rather, the formed end-to-end spot beams 125 may be effectively relayed, since the end-to-end spot beams 125 may have uplink signal paths, relay signal paths (via a satellite 120 or other suitable end-to-end relay), and downlink signal paths.

Because an end-to-end beamforming system may take into account both a user link and a feeder link, as well as an end-to-end relay, only a single set of beam weights is needed to form the desired end-to-end spot beams 125 in a particular direction (e.g., forward spot beams 125 or return spot beams 125). Thus, one set of end-to-end forward beam weights results in the signals transmitted from the access node terminals 130, through the forward uplink, through the end-to-end relay, and through the forward downlink to combine to form the end-to-end forward spot beams 125. Conversely, signals transmitted from return users through the return uplink, through the end-to-end relay, and the return downlink have end-to-end return beam weights applied to form the end-to-end return spot beams 125. Under some conditions, it may be difficult or impossible to distinguish between the characteristics of the uplink and the downlink. Accordingly, formed feeder link spot beams 125, formed spot beam directivity, and individual uplink and downlink carrier to interference ratio (C/I) may no longer have their traditional role in the system design, while concepts of uplink and downlink signal-to-noise ratio (Es/No) and end-to-end C/I may still be relevant.

Figure 5A:
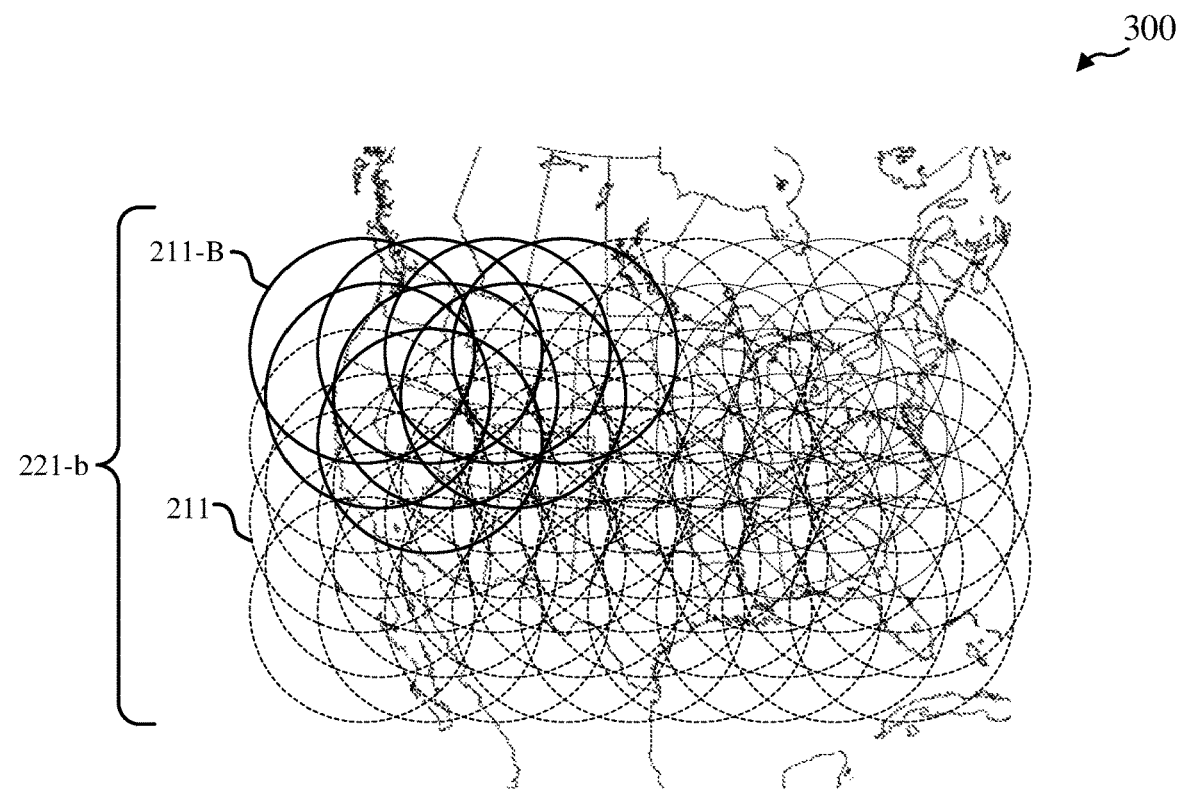
FIGS. 5A and 5B illustrate an example of beamforming to form spot beam coverage areas over a native antenna pattern coverage area in accordance with examples as disclosed herein.
Figure 5B:
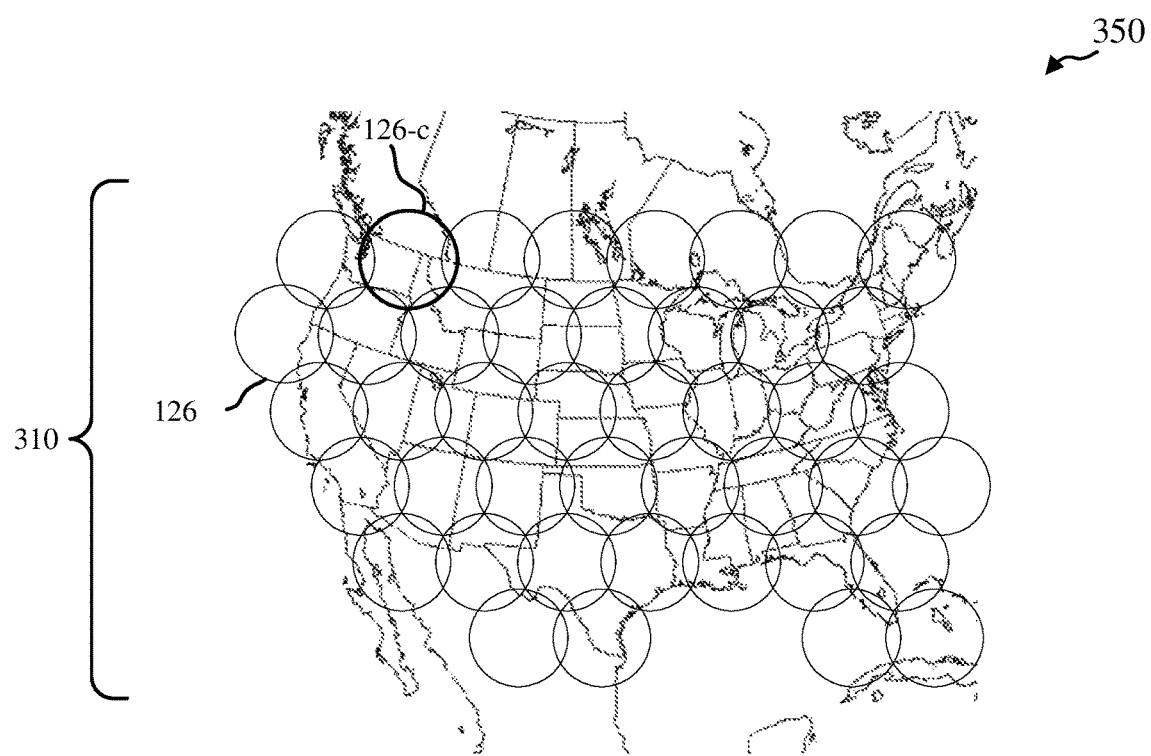

FIGS. 5A and 5B illustrate an example of beamforming to form spot beam coverage areas 126 over a native antenna pattern coverage area 221-*b* in accordance with examples as disclosed herein. In FIG. 5A, diagram 300 illustrates native antenna pattern coverage area 221-*b* that includes multiple native feed element pattern coverage areas 211 that may be provided by a defocused multi-feed antenna assembly 121. Each of the native feed element pattern coverage areas 211 may be associated with a respective feed element 128 of a feed array assembly 127 of the antenna assembly 121. In FIG. 5B, diagram 350 shows a pattern of spot beam coverage areas 126 over a service coverage area 310 of the continental United States. The spot beam coverage areas 126 may be provided by applying beamforming coefficients to signals carried via the feed elements 128 associated with the multiple native feed element pattern coverage areas 211 of FIG. 5A.

Each of the spot beam coverage areas 126 may have an associated spot beam 125 which, in some examples, may be based on a predetermined beamforming configuration configured to support a communications service or other primary or real-time mission within the respective spot beam coverage areas 126. Each of the spot beams 125 may be formed from a composite of signals carried via multiple feed elements 128 for those native feed element pattern coverage areas 211 that include the respective spot beam coverage area 126. For example, a spot beam 125 associated with spot beam coverage area 126-*c* shown in FIG. 5B may be a composite of signals via the eight feed elements 128 associated with the native feed element pattern coverage areas 211-*b* shown with dark solid lines in FIG. 5A. In various examples, spot beams 125 with overlapping spot beam coverage areas 126 may be orthogonal in frequency, polarization, and/or time, while non-overlapping spot beams 125 may be non-orthogonal to each other (e.g., a tiled frequency reuse pattern). In other examples, non-orthogonal spot beams 125 may have varying degrees of overlap, with interference mitigation techniques such as ACM, interference cancellation, or space-time coding used to manage inter-beam interference.

Beamforming may be applied to signals transmitted or received via the satellite using OBBF, GBBF, or end-to-end beamforming transmit/receive signal paths. Thus, the service provided over the spot beam coverage areas 126 illustrated in FIG. 5B may be based on the native antenna pattern coverage area 221-*b* of the antenna assembly 121 as well as beam weights applied. Although service coverage area 310 is illustrated as being provided via a substantially uniform pattern of spot beam coverage areas 126 (e.g., having equal or substantially equal beam coverage area sizes and amounts of overlap), in some examples spot beam coverage areas 126 for a service coverage area 310 may be non-uniform. For example, areas with higher population density may be provided a communications service using relatively smaller spot beams 125 while areas with lower population density may be provided the communications service using relatively larger spot beams 125.

Figure 6:
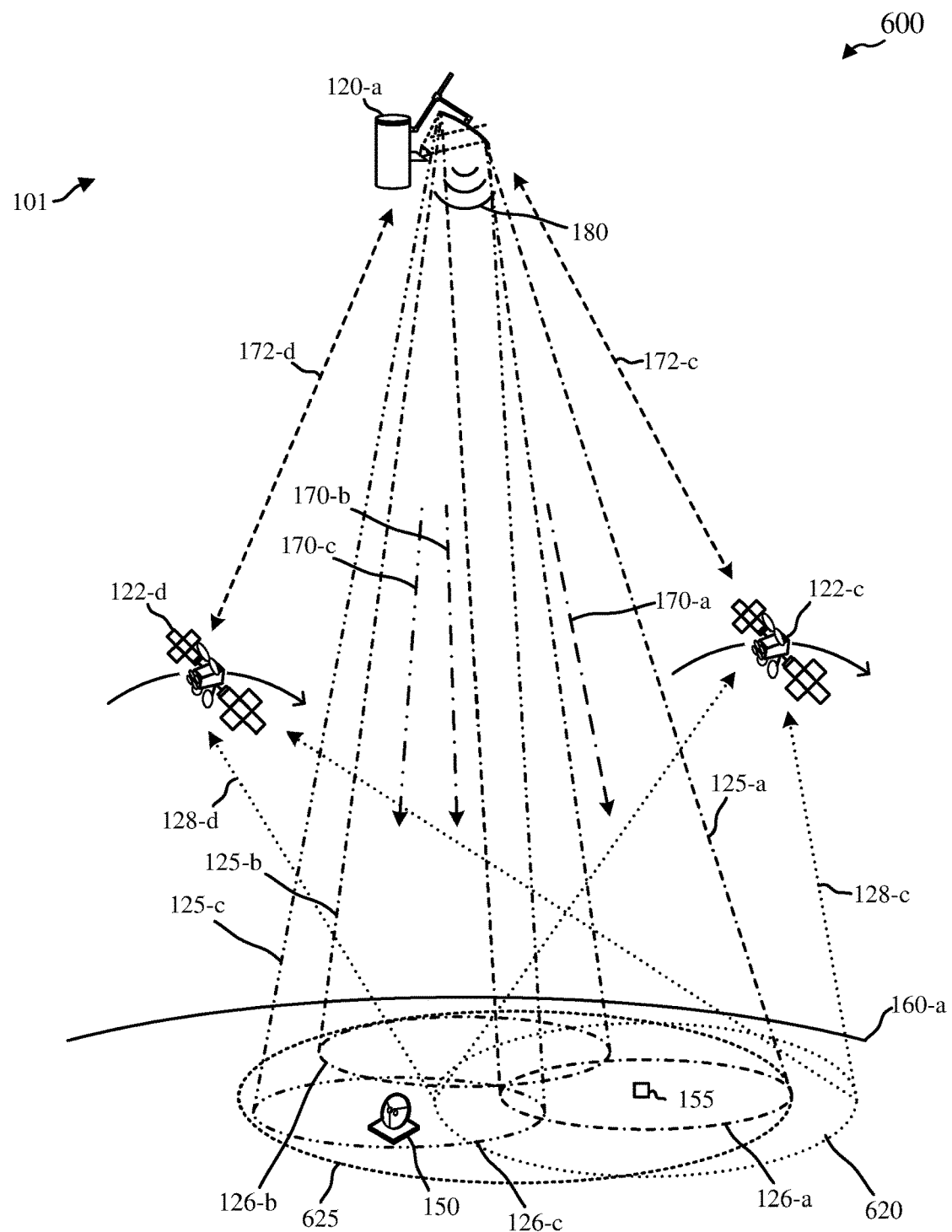
FIG. 6 shows a diagram of a system including a device that supports techniques for multi-static synthetic aperture radar in accordance with examples as disclosed herein.

FIG. 6 shows a diagram of a satellite system 600 that supports multi-static synthetic aperture radar using low earth orbit collection in accordance with examples as disclosed herein. Satellite system 600 may include an illumination satellite 120-*a* and multiple collection satellites 122. For example, the satellite system 600 may include a GEO satellite 120-*a* and multiple collection satellites 122 (e.g., collection satellites 122-*c* and 122-*d*). In some examples, satellite system 600 may include more than one illumination satellite 120, which may each be in a similar orbit (e.g., different GEO orbital slots). The collection satellites 122 may be in a different orbit than the illumination satellite (e.g., LEO or MEO).

The illumination satellite 120-*a* may be a communications satellite and may transmit over multiple feeds to generate spot beams (e.g., beamformed spot beams 125). FIG. 6 illustrates three spot beams, spot beams 125-*a*, 125-*b*, and 125-*c*. Each of the spot beams 125 may be associated with a corresponding user beam coverage area 126. As the user beam coverage areas 126-*a*, 126-*b*, and 126-*c* are adjacent to one another, each of the corresponding spot beams 125-*a*, 125-*b*, and 125-*c* may use a different combination of frequency range and polarization (e.g., "color"). For example, spot beams 125-*a*, 125-*b*, and 125-*c* may each be associated with a same polarization (e.g., RHCP or LHCP) and may use different frequency ranges, or the frequency range for two of spot beams 125-*a*, 125-*b*, and 125-*c* may be the same, and the two spot beams may use different (e.g., orthogonal) polarizations.

The communication signals transmitted by satellite 120 may be employed as an illumination source for a multi-static synthetic aperture radar. For example, forward downlink signals 170 may reflect off the surface 160 or objects 155 and be received by the collection satellites 122 in a multi-static configuration. As illustrated in FIG. 6, multiple collection satellites may have at least partially overlapping fields of view 620. In some examples, the fields of view 620 of illumination satellites may be arranged to cover an area that may encompass a limited number (e.g., one, two, etc.) of user beam coverage area 126 associated with spot beams 125 having the same "color." For example, the user beam coverage areas 126 of spot beams of the same color may be separated by a separation distance, and the fields of view 620 may be arranged to cover an area not extending larger than a certain multiple of the separation distance. The collection satellites 122 may receive reflected signals 128 over a bandwidth range that includes each of the spot beams 125. For example, spot beams 125 may use a four, five, six, seven, or eight "color" arrangement, where a frequency band used for transmission of beam signals 170 may be divided up into two, three, or four sub-bands associated with the different spot beams 125. The collection satellites 122 may each receive over the full range of the frequency band and multiple polarizations, and thus may receive reflected signals 128 associated with different spot beams concurrently.

The collection satellites 122 may perform signal processing including digitization (e.g., sampling) and compression, and may send the sampled signals to a multi-static SAR processor 145 for processing. In some examples, the collection satellites 122 may send the sampled signals to the multi-static SAR processor 145 via an illumination satellite 120 (e.g., a same satellite that transmitted the beam signals 125 for which it capture the reflected beam signals 128). In some examples, the illumination satellite 120 may be an end-to-end relay or may be used in a GBBF system, and the collection satellites 122 may transmit return uplink signals in communication links 172 to the illumination satellite 120 (e.g., collection satellite 122-*c* may transmit return uplink signals in communication link 172-*c* and collection satellite 122-*d* may transmit return uplink signals in communication link 172-*d*). The illumination satellite 120 may relay the return uplink signals in return downlink signals (not shown) to one or more access node terminals (not shown). The access node terminals may receive the return downlink signals and send the return downlink signals to a beamforming processor 135 for processing. The beamforming processor 135 may recover the uplink beam signals (e.g., including the sampled reflected beams signals 128) transmitted by the collection satellites 122, and pass the uplink beam signals to the multi-static SAR processor 145. The beamforming processor 135 may also send the beamforming coefficients used in generating the beam signals 125 to the multi-static SAR processor 145.

The multi-static SAR processor 145 may process the sampled reflected beams signals 128 from each of the collection satellites 122 to obtain multi-static SAR data corresponding to the user beam coverage areas 126. For example, to obtain the multi-static SAR data corresponding to user beam coverage area 126-a, the multi-static SAR processor 145 may filter the sampled reflected beams signals 128 (e.g., corresponding to reflected beam signals 128-c and 128-d) for the frequency range associated with the spot beam signal 170-a. In addition, the multi-static SAR processor 145 may process the sampled reflected beams signals 128 according to the gain profile of the user beam 125-a over the beam coverage area 126-a. For example, areas of higher signal power may be weighted more heavily in the processed signal. The spatial separation of the multiple collection satellites may provide opportunity for cross track interferometry. In addition, spatial and temporal diversity of multiple collection satellites 122 may provide additional resolution. For example, a given user beam coverage area 126-a may fall within the fields of view 620 of several different collection satellites 122 over a time period. The multi-static SAR processor 145 may distinguish different spot beam signals 170 based on the field of view as well as signal information (e.g., the beam signal). In some cases, several collection satellites, of which only two are shown, may pass over user beam coverage area 126-a at different points of a given time period. The multi-static SAR processor 145 may process the sampled reflected beams signals 128 from each of the collection satellites 122 to provide varied cross track interferometry and temporal diversity to obtain image data associated with the reflected signals within user beam coverage area 126-a. In addition, different reflected signals may be obtained from signals transmitted by different illumination satellites 120 (e.g., which may use different frequency ranges or polarizations) of a same area. The multi-static SAR processor 145 may perform similar operations for each user beam coverage area 126 (e.g., user beam coverage areas 125-b and 125-c with spot beam signals 170-b and 170-d), and combine the data from each user beam coverage area 126 to generate an image of a desired geographic area (625).

Figure 7:
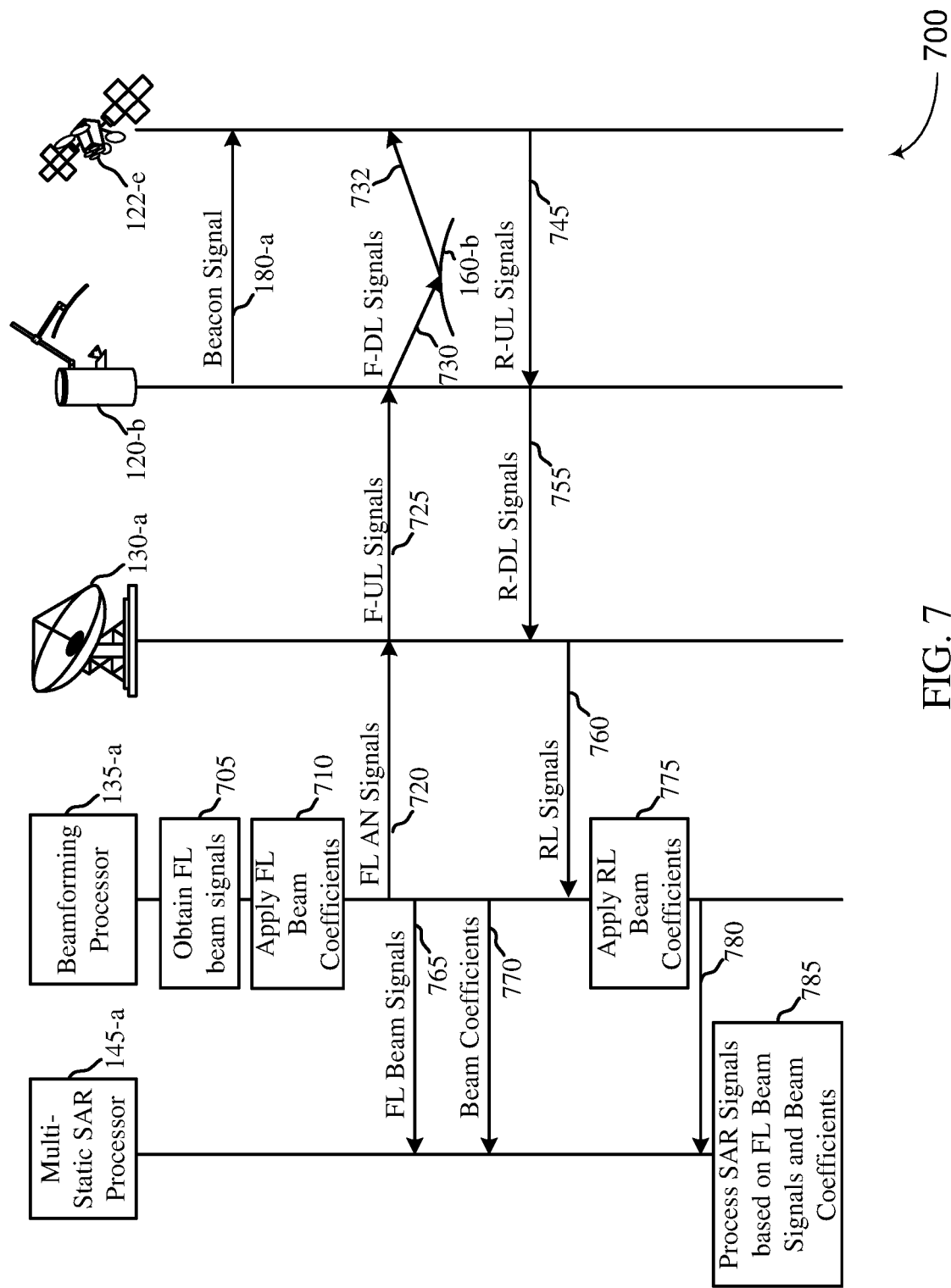
FIG. 7 shows a process flow that supports techniques for multi-static synthetic aperture radar in accordance with examples as disclosed herein.

FIG. 7 illustrates an example of a flow diagram 700 that supports multi-static synthetic aperture radar using low earth orbit collection in accordance with examples as disclosed herein. Flow diagram 700 may be implemented in satellite system 100 or 200. For example, the flow diagram may be implemented in a satellite system including a multi-static SAR processor 145-a, a beamforming processor 135-a, one or more access node terminals 130-a, one or more illumination satellites 120-a, and one or more collection satellites 122-e. In some cases, the one or more illumination satellites 120-a may provide a communication service to multiple user beam coverage areas via multiple user spot beams, and may be a GEO satellite. The one or more collection satellites 122-e may be LEO or MEO satellites.

The illumination satellite 120-a may transmit a beacon signal 180-a, which may be used by the collection satellites 122-e as a frequency and/or phase reference. For example, the collection satellites 122-e may synchronize timing to the beacon signal 180-a to determine phase information for received reflected signals.

The beamforming processor 135-a may obtain forward link (FL) beam signals at 705. For example, downlink data intended for user terminals may be identified and formed (e.g., encoded, modulated) into FL beam signals for transmission in a given time period (e.g., slot or frame). At 710, the beamforming processor 135-a may apply beamforming coefficients to the FL beam signals to obtain FL AN signals 720. For example, the FL AN signals 720 may be signals corresponding to feed elements of satellite 120-b for GBBF, or may be signals for transmission by access node terminals 130-a in an end-to-end beamforming system. The beamforming processor 135-a may provide the FL AN signals 720 to the access node terminals 130-a.

The access node terminals 130-a may transmit forward uplink (F-UL) signals 725 based on the FL AN signals 720 received from the beamforming processor 135-a. The satellite 120-b may receive the F-UL signals 725 and transmit forward downlink (F-DL) signals 730, which may form spot beams based on the beamforming coefficients applied by the beamforming processor 135-a. For example, in a GBBF system, each feed of satellite 120-b may transmit a signal received from an access node terminal 130-a, which may combine to form the spot beams. Alternatively, in an end-to-end beamforming system, satellite 120-b may include a number of transmit/receive signal paths, and each transmit/receive signal path may transmit a composite of F-UL signals 725 received from one or more access node terminals 130-a.

The F-DL signals 730 forming spot beams carrying the beam signals may reflect off a surface 160-b as reflected beam signals 732, and may be received by the collection satellites 122-e. The collection satellites 122-e may sample the reflected beam signals 732 and send the sampled reflected beam signals 732 to the multi-static SAR processor 145-a for processing. The collection satellites 122-e may also receive F-DL signals 730 directly (e.g., not reflected), and may use the F-DL signals 730 to determine various information for the sampled reflected beam signals 732. For example, in addition or in the alternative to using beacon signal 180-a, the collection satellites 122-e may use the F-DL signals 730 as a reference for determining frequency, phase, or time of arrival of the reflected beam signals 732. In addition, the collection satellites 122-e may use the F-DL signals 730 for determining atmospheric corrections or coherence for the reflected beam signals 732. The collection satellites 122-e may transmit return uplink (R-UL) signals 745 including the sampled reflected beam signals to satellite 120-b (which may be the same satellite as the illumination satellite, or a different satellite, in some cases). Satellite 120-b may relay the R-UL signals in R-DL signals 755 to access node terminals 130-a. Access node terminals 130-a may receive and process (e.g., sample) R-DL signals 755 and send RL signals 760 including the sampled R-DL signals 755 to the beamforming processor 135-a.

Beamforming processor 135-a may apply RL beam coefficients to the RL signals 760 at 775. For example, in a GBBF system each receive feed of satellite 120-b may be in a separate R-DL signal 755. Alternatively, in an end-to-end beamforming system, satellite 120-b may relay R-UL signals 745 via multiple transmit/receive signal paths, and thus each R-DL signal 755 received by an access node terminal 130-a may be a composite signal including signals from multiple RL spot beams carried by at least a subset of the multiple transmit/receive signal paths of the satellite 120-b. Thus, beamforming processor 135-a may receive the composite signals from each of multiple access node terminals 130-a and apply RL beamforming coefficients representing the end-to-end beamforming matrices between RL beams and the multiple access node terminals 130-*a* to recover RL beam signals. Beamforming processor 135-*a* may send the RL beam signals to the multi-static SAR processor 145-*a* for processing.

The multi-static SAR processor 145-*a* may obtain the sampled reflected beam signals 732 from the RL beam signals 780. Alternatively, the multi-static SAR processor 145-*a* may obtain the sampled reflected beam signals 732 via another route. For example, collection satellites 122-*e* may transmit the sampled reflected beam signals directly to a ground station (not shown). The multi-static SAR processor 145-*a* may process the sampled reflected beams signals 732 from each of the collection satellites 122-*e* to obtain multi-static SAR data corresponding to the user beam coverage areas of the F-DL signals 730. The multi-static SAR processor 145-*a* may also obtain the signal information for the F-DL signals 730 from the beamforming processor 135-*a*. For example, the beamforming processor 135-*a* may provide FL beam signals 765 to the multi-static SAR processor 145-*a*. In addition, the beamforming processor 135-*a* may provide beam coefficients 770 to the multi-static SAR processor 145-*a*.

The multi-static SAR processor 145-*a* may process the sampled reflected beam signals 732 based on the FL beam signals 765 and the beam coefficients 770 at 785. For example, for a given FL beam formed by an illumination satellite 120-*b*, the multi-static SAR processor 145-*a* may evaluate the sampled reflected beam signals 732 from each collection satellite 122-*e* having a field of view including portions or all of the FL beam. For example, the multi-static SAR processor 145-*a* may use the beam coefficients 770 to determine properties of the FL beam including a gain profile, and may use the FL beam signals 765 to determine radar information (e.g., range, reflectivity) associated with the reflected beam signals 732 due to the terrain or objects encountered by the F-DL signals 730. The multi-static SAR processor 145-*a* may use the sampled reflected beam signals 732 corresponding to concurrent (e.g., phase correlated) F-DL signals 730 from multiple collection satellites 122-*e* to increase the range and accuracy. In addition, the multi-static SAR processor 145-*a* may use the sampled reflected beam signals 732 from multiple collections satellites 122-*e* from multiple points in time to obtain a synthetic aperture corresponding to the imaging information associated with a FL beam. Thus, the multi-static SAR processor 145-*a* may build an image for the beam coverage area for each FL beam based on sampled reflected beam signals 732 from multiple collection satellites 122-*e* that have fields of view at least partially overlapping with the beam coverage area over a period of time. For example, the multi-static SAR processor 145-*a* may determine an amount of overlap of the field of view for each collection satellite 122-*e* with the beam coverage area, and apply the overlap and beam gain profile to weight the sampled reflected beam signals 732 from each of the collection satellites 122-*e* for each point in time.

Figure 8:
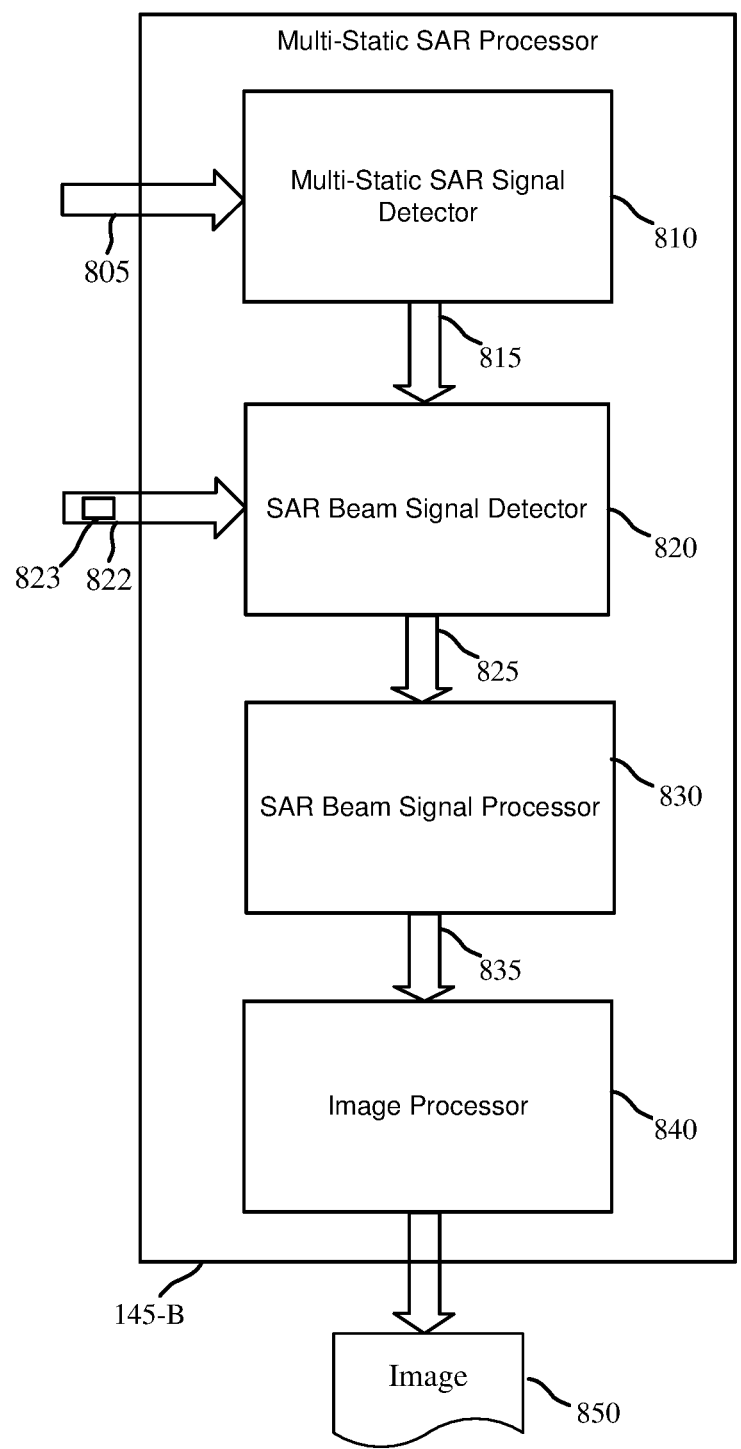
FIG. 8 shows a diagram of a multi-static SAR processor that supports techniques for multi-static synthetic aperture radar using low earth orbit collection in accordance with examples as disclosed herein.

FIG. 8 shows a diagram of a multi-static SAR processor 145-*b* that supports techniques for multi-static synthetic aperture radar using low earth orbit collection in accordance with examples as disclosed herein. The multi-static SAR processor 145-*b* may include multi-static SAR signal detector 810, SAR beam signal detector 820, SAR beam signal processor 830, and image processor 840. Each of these modules may communicate, directly or indirectly, with one another (e.g., via one or more buses).

The multi-static SAR signal detector 810 may receive sampled reflected beam signals 805 in a multi-static system with one or more illumination satellites and one or more collection satellites. For example, the one or more illumination satellites may be GEO satellites and the collection satellites may be in a different orbit (e.g., LEO or MEO). The one or more illumination satellites may be communications satellites and may transmit over multiple feeds to generate spot beams. The signals from the spot beams may reflect off terrain and objects and the reflected signals may be received and sampled at the collection satellites. The collection satellites may use a beacon signal (e.g., beacon signal 180) or the spot beam signals themselves (e.g., direct, non-reflected spot beam signals) as a reference for determining frequency, phase, or time of arrival of the reflected beam signals. The multi-static SAR signal detector 810 may process the sampled reflected beam signals 805 to obtain signal information for each of multiple spot beams (e.g., based on frequency range, polarization, or field of view of the collection satellites). The multi-static SAR signal detector 810 may pass the spot beam signal information 815 to the SAR beam signal detector 820.

The SAR beam signal detector 820 may receive the spot beam signal information 815 from the multi-static SAR signal detector 810. The SAR beam signal detector 820 may also receive beam information 822, which may include beam signals or beam coefficients (e.g., a beamforming matrix 823 used to form the forward downlink beams) associated with the beamformed spot beams. The SAR beam signal detector 820 may, for each beam coverage area, determine reflected signal information (e.g., range, reflectivity) based on the spot beam signal information 815, and the beam information 822. For example, the SAR beam signal detector 820 may determine reflected signal information for each beam signal received at each collection satellite and send reflected signal information 825 to the SAR beam signal processor 830. For example, SAR beam signal detector 820 may determine reflected signal information 825 based on the spot beam signal gain profiles and beam signal.

The SAR beam signal processor 830 may receive reflected signal information 825 and may determine image information associated with each spot beam coverage area based on the reflected signal information 825. The SAR beam signal processor 830 may apply the interferometry from reflected signal information 825 from different collection satellites, and may further synthesize the aperture for imaging within each spot beam coverage area based on reflected signal information from multiple collection satellites over different time periods. For example, the SAR beam signal processor 830 may receive information for the location of the collection satellites at each point in time to synthesize the aperture using multiple collections satellites as well as multiple collection satellites over time. The SAR beam signal processor 830 may pass beam image information 835 to the image processor 840.

The image processor 840 may generate an image 850 from the beam image information 835. For example, the image processor 840 may combine beam image information 835 for different beam coverage areas, or assign image properties (e.g., brightness, hue) to pixels of an image based on beam image information 835.

Figure 9:
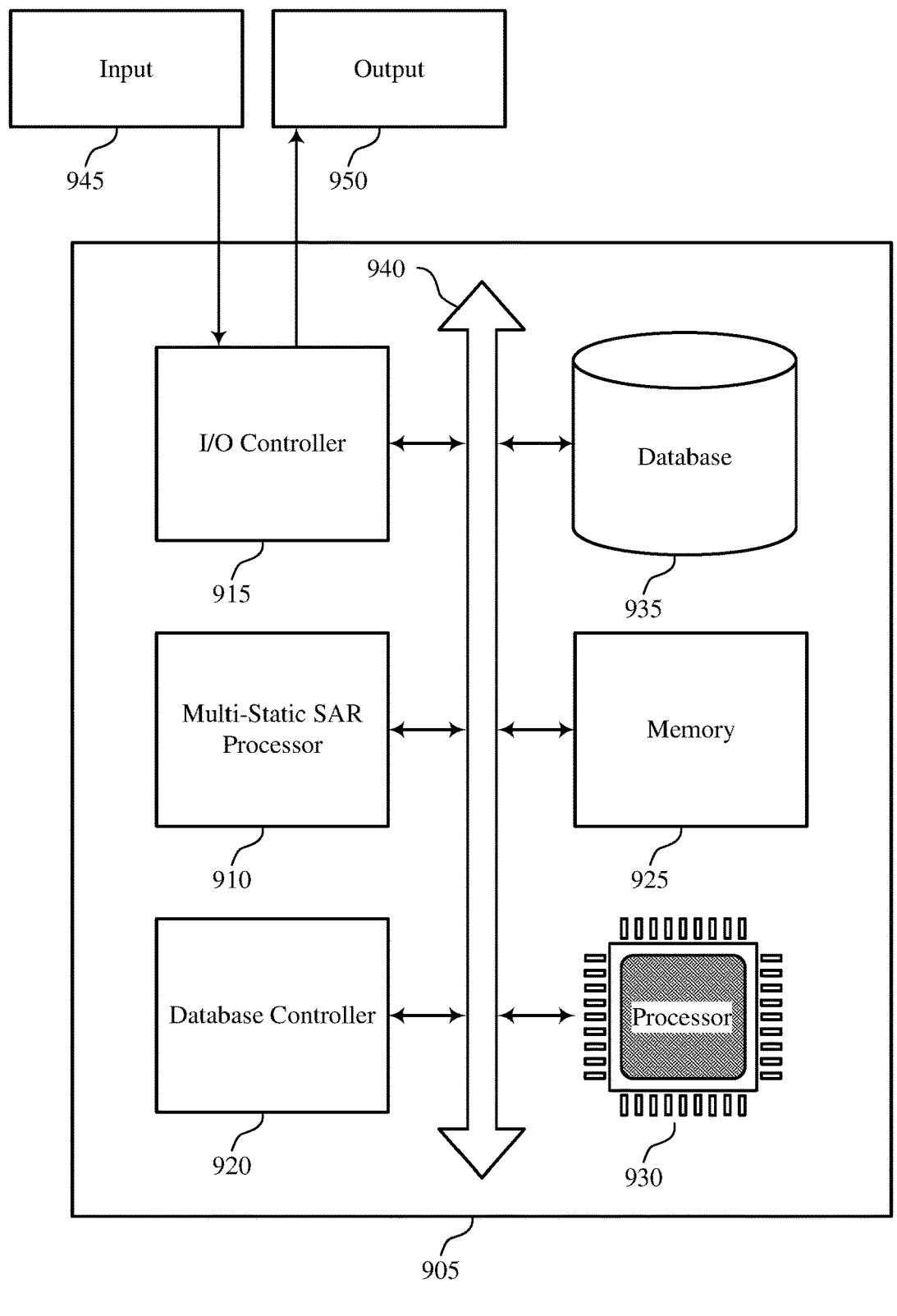
FIG. 9 shows a diagram of a system including a device that supports techniques for multi-static synthetic aperture radar in accordance with examples as disclosed herein.

FIG. 9 shows a diagram of a system 900 including a device 905 that supports techniques for multi-static synthetic aperture radar in accordance with examples as disclosed herein. The device 905 may be an example of or include the components of a reception processing system as described herein. The device 905 may include components for bi-directional data communications including components for transmitting and receiving communications, including a multi-static SAR processor 910, an I/O controller 915, a database controller 920, memory 925, a processor 930, and a database 935. These components may be in electronic communication via one or more buses (e.g., bus 940).

The multi-static SAR processor 910 may be an example of a multi-static SAR processor 145 as described herein. In some cases, the multi-static SAR processor 910 may be implemented in hardware, software executed by a processor, firmware, or any combination thereof. For example, the multi-static SAR processor 910 may receive sampled reflected beam signals (e.g., via I/O controller 915) and process the sampled reflected beam signals to generate multi-static synthetic radar aperture images. The sampled reflected beam signals may correspond to signals received by one or more collection satellites, and may be received by system 900 via a satellite (e.g., via the illumination satellite), or directly from the collection satellite to ground station. The multi-static SAR processor 910 may process the sampled reflected beam signals according to beam information (e.g., beam signals, beam coefficients) to obtain beam information for each of the collection satellites over a time period. The multi-static SAR processor 910 may generate image pixel values (e.g., intensity, hue) based on the processed beam information and additional information related to the collection satellites (e.g., location, atmospheric correction). The multi-static SAR processor 910 may output the images in output signals 950 via I/O controller 915 (e.g., for display on a display device or storage on a storage medium).

The I/O controller 915 may manage input signals 945 and output signals 950 for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a data lake, or an emergency backup database. The database 935 may, for example, store the multiple beam weight sets for use by the multi-static beamforming system 910.

Memory 925 may include random-access memory (RAM) and read-only memory (ROM). The memory 925 may store computer-readable, computer-executable software including instructions that, when executed (e.g., by processor 930), cause the processor to perform various functions described herein. For example, the memory 925 may store instructions for the operations of the multi-static SAR processor 910 described herein. In some cases, the memory 925 may contain, among other things, a basic input/output system (BIOS) which may control basic hardware or software operation such as the interaction with peripheral components or devices.

The processor 930 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions.

Figure 10:
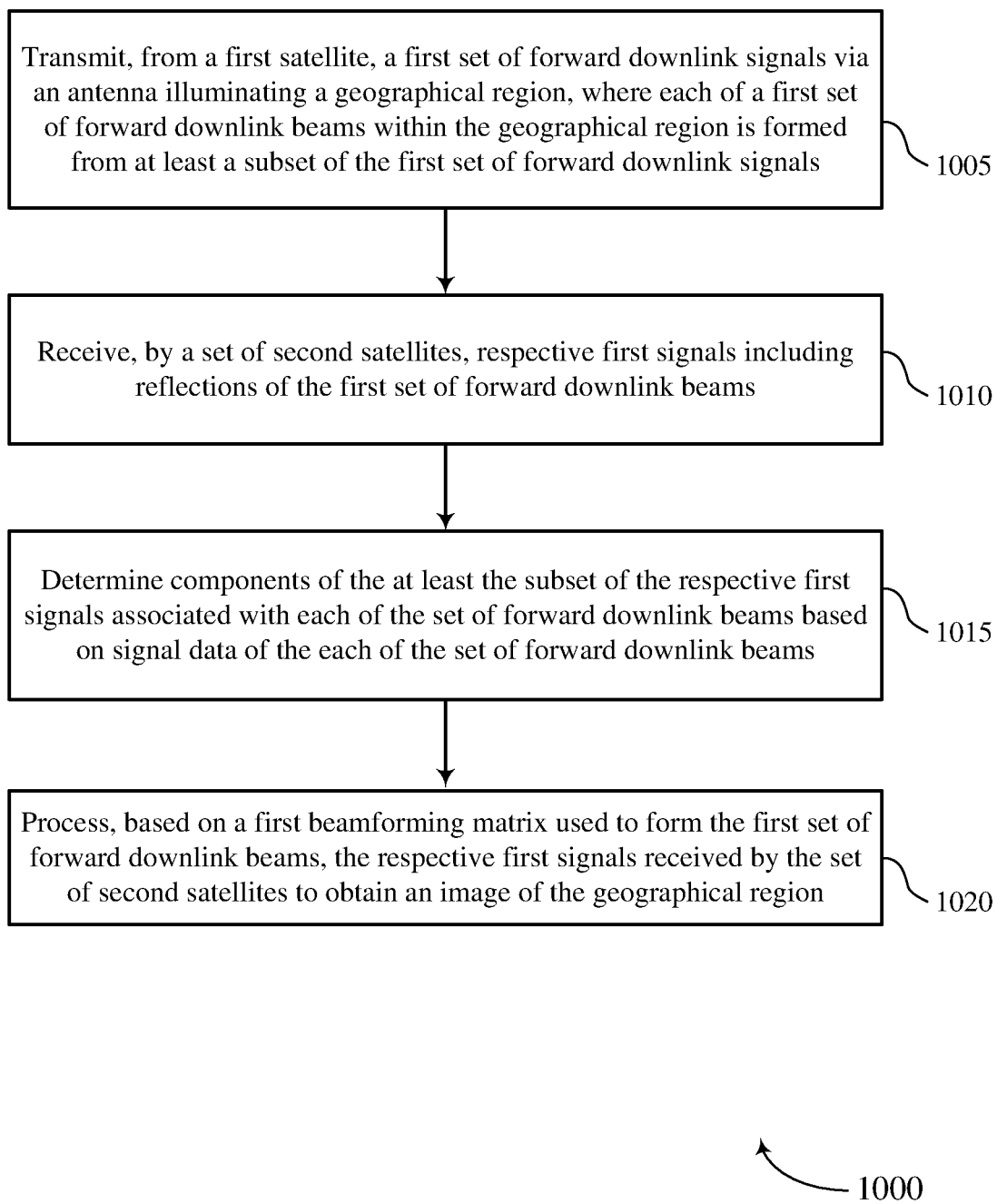
FIG. 10 shows a flowchart illustrating a method that supports multi-static synthetic aperture radar using low earth orbit collection in accordance with examples as disclosed herein.

FIG. 10 shows a flowchart illustrating a method 1000 that supports multi-static synthetic aperture radar using low earth orbit collection in accordance with examples as disclosed herein. The operations of method 1000 may be implemented by satellite system or its components as described herein. For example, the operations of method 1000 may be performed by the satellite system 100 or satellite system 600. In some examples, components of a satellite system may execute a set of instructions to control the functional elements of the satellite system to perform the functions described below. Additionally or alternatively, components of a satellite system may perform aspects of the functions described below using special-purpose hardware.

At 1005, a first satellite of the satellite system may transmit a first set of forward downlink signals via an antenna illuminating a geographical region, where each of a first set of forward downlink beams within the geographical region is formed from at least a subset of the first set of forward downlink signals. Transmitting the first plurality of forward downlink signals from the first satellite may comprise applying, at the first satellite, the first beamforming matrix to a plurality of forward uplink signals received from a satellite access node to obtain the first plurality of forward downlink signals. Alternatively, transmitting the first plurality of forward downlink signals from the first satellite may comprise transmitting, from a plurality of satellite access nodes, respective forward uplink signals and relaying, by a plurality of transmit/receive signal paths of the first satellite, the respective forward uplink signals, wherein each of the first plurality of forward downlink signals comprises a composite of at least a subset of the respective forward uplink signals. The first set of forward downlink signals may be beam signals carrying communication data for user terminals in the first set of forward downlink beams. The first satellite may be a GEO satellite. The operations of 1005 may be performed according to the methods described herein. In some examples, aspects of the operations of 1005 may be performed by an illumination satellite 120 as described with reference to FIG. 1 or 6.

At 1010, a set of second satellites may receive respective first signals including reflections of the first set of forward downlink beams. The second set of satellites may be LEO or MEO satellites. The operations of 1010 may be performed according to the methods described herein. In some examples, aspects of the operations of 1010 may be performed by collection satellites 122 as described with reference to FIG. 1 or 6.

At 1015, a multi-static SAR processor may determine components of the at least the subset of the respective first signals associated with each of the set of forward downlink beams based on signal data of the each of the set of forward downlink beams. For example, the first plurality of forward downlink beams may comprise a plurality of forward downlink beams having a first combination of polarization and frequency range, and at least a subset of the respective first signals may comprise respective composite reflections from the plurality of forward downlink beams having the first combination of polarization and frequency range. The operations of 1015 may be performed according to the methods described herein. In some examples, aspects of the operations of 1015 may be performed by a SAR beam signal detector as described with reference to FIG. 8.

At 1020, the multi-static SAR processor may process, based on a first beamforming matrix used to form the first set of forward downlink beams, the respective first signals received by the set of second satellites to obtain an image of the geographical region. The processing of the respective first signals received by the set of second satellites to obtain the image may be based on the beam signals of the first set of forward downlink beams. The operations of 1020 may be performed according to the methods described herein. In some examples, aspects of the operations of 1020 may be performed by a SAR beam signal processor 830 as described with reference to FIG. 8.

Aspects of steps 1005, 1010, 1015, or 1020 may be performed over multiple time durations. For example, the first satellite may transmit a second plurality of forward downlink signals corresponding to a second time duration, where the second plurality of forward downlink signals form a second plurality of forward downlink beams over the geographical region. The plurality of second satellites may receive respective second signals comprising reflections of the second plurality of forward downlink beams. The multi-static SAR processor may process the respective second signals received by the plurality of second satellites to obtain the image of the geographical region. Processing of the respective second signals may be based on a same beamforming matrix as used for generating the first plurality of forward downlink signals, or a second, different beamforming matrix, in some cases.

It should be noted that the described techniques refer to possible implementations, and that operations and components may be rearranged or otherwise modified and that other implementations are possible. Further portions from two or more of the methods or apparatuses may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    transmitting, from a first satellite, a first plurality of forward downlink signals via an antenna illuminating a geographical region, wherein each of a first plurality of forward downlink beams within the geographical region is formed from at least a subset of the first plurality of forward downlink signals;
    receiving, by a plurality of second satellites, respective first signals comprising reflections of the first plurality of forward downlink beams; and
    processing, based at least in part on a first beamforming matrix used to form the first plurality of forward downlink beams, the respective first signals received by the plurality of second satellites to obtain an image of the geographical region.

2. The method of claim 1, wherein the first plurality of forward downlink beams comprises a plurality of forward downlink beams having a first combination of polarization and frequency range, and wherein at least a subset of the respective first signals comprise respective composite reflections from the plurality of forward downlink beams having the first combination of polarization and frequency range, and wherein the processing comprises:
    determining components of the at least the subset of the respective first signals associated with each of the plurality of forward downlink beams based at least in part on signal data of the each of the plurality of forward downlink beams.

3. The method of claim 1, wherein the first plurality of forward downlink signals correspond to a first time duration, the method further comprising:
    transmitting, from the first satellite, a second plurality of forward downlink signals corresponding to a second time duration, wherein the second plurality of forward downlink signals form a second plurality of forward downlink beams over the geographical region;
    receiving, by the plurality of second satellites, respective second signals comprising reflections of the second plurality of forward downlink beams; and
    processing, based at least in part on a second beamforming matrix used to form the second plurality of forward downlink beams, the respective second signals received by the plurality of second satellites to obtain the image of the geographical region.

4. The method of claim 3, wherein the first plurality of forward downlink beams are associated with a first beam coverage pattern comprising a first plurality of beam coverage areas associated with a first polarization and a first frequency range, and wherein the second plurality of forward downlink beams are associated with a second beam coverage pattern comprising a second plurality of beam coverage areas associated with the first polarization and the first frequency range, and wherein the second plurality of beam coverage areas are offset from the first plurality of beam coverage areas.

5. The method of claim 3, wherein the first plurality of forward downlink beams are associated with a first beam coverage pattern comprising a first beam coverage area associated with a first combination of polarization and frequency range, and wherein the second plurality of forward downlink beams are associated with a second beam coverage pattern comprising a second beam coverage area associated with a second combination of polarization and frequency range, and wherein the second beam coverage area is substantially overlapping with the first beam coverage area.

6. The method of claim 1, wherein transmitting the first plurality of forward downlink signals from the first satellite comprises:
    applying, at the first satellite, the first beamforming matrix to a plurality of forward uplink signals received from a satellite access node to obtain the first plurality of forward downlink signals.

7. The method of claim 1, wherein transmitting the first plurality of forward downlink signals from the first satellite comprises:
    transmitting, from a plurality of satellite access nodes, respective forward uplink signals; and
    relaying, by a plurality of transmit/receive signal paths of the first satellite, the respective forward uplink signals, wherein each of the first plurality of forward downlink signals comprises a composite of at least a subset of the respective forward uplink signals.

8. The method of claim 1, wherein the first plurality of forward downlink signals comprises a plurality of forward user data streams for transmission to a plurality of user terminals within the geographical region.

9. The method of claim 1, wherein the first satellite is a geostationary satellite and the plurality of second satellites are low earth orbit satellites.

10. An imaging system, comprising:
    a first satellite configured to transmit a first plurality of forward downlink signals via an antenna illuminating a geographical region, wherein each of a first plurality of forward downlink beams within the geographical region is formed from at least a subset of the first plurality of forward downlink signals;
    a plurality of second satellites configured to receive respective first signals comprising reflections of the first plurality of forward downlink beams; and
    at least one processor configured to process, based at least in part on a first beamforming matrix used to form the first plurality of forward downlink beams, the respective first signals received by the plurality of second satellites to obtain an image of the geographical region.

11. The imaging system of claim 10, wherein the first plurality of forward downlink beams comprises a plurality of forward downlink beams having a first combination of polarization and frequency range, and wherein at least a subset of the respective first signals comprise respective composite reflections from the plurality of forward downlink beams having the first combination of polarization and frequency range, and wherein the at least one processor is configured to determine components of the at least the subset of the respective first signals associated with each of the plurality of forward downlink beams based at least in part on signal data of the each of the plurality of forward downlink beams.

12. The imaging system of claim 10, wherein the first plurality of forward downlink signals correspond to a first time duration, and wherein:
   the first satellite is configured to transmit a second plurality of forward downlink signals corresponding to a second time duration, wherein the second plurality of forward downlink signals form a second plurality of forward downlink beams over the geographical region;
   the plurality of second satellites are configured to receive respective second signals comprising reflections of the second plurality of forward downlink beams; and
   the at least one processor is configured to process, based at least in part on a second beamforming matrix used to form the second plurality of forward downlink beams, the respective second signals received by the plurality of second satellites to obtain the image of the geographical region.

13. The imaging system of claim 12, wherein the first plurality of forward downlink beams are associated with a first beam coverage pattern comprising a first plurality of beam coverage areas associated with a first polarization and a first frequency range, and wherein the second plurality of forward downlink beams are associated with a second beam coverage pattern comprising a second plurality of beam coverage areas associated with the first polarization and the first frequency range, and wherein the second plurality of beam coverage areas are offset from the first plurality of beam coverage areas.

14. The imaging system of claim 12, wherein the first plurality of forward downlink beams are associated with a first beam coverage pattern comprising a first beam coverage area associated with a first combination of polarization and frequency range, and wherein the second plurality of forward downlink beams are associated with a second beam coverage pattern comprising a second beam coverage area associated with a second combination of polarization and frequency range, and wherein the second beam coverage area is substantially overlapping with the first beam coverage area.

15. The imaging system of claim 10, wherein the first satellite is configured to apply the first beamforming matrix to a plurality of forward uplink signals received from a satellite access node to obtain the first plurality of forward downlink signals.

16. The imaging system of claim 10, further comprising:
   a plurality of satellite access nodes configured to transmit respective forward uplink signals,
   wherein the first satellite comprises a plurality of transmit/receive signal paths configured to relay the respective forward uplink signals, wherein each of the first plurality of forward downlink signals comprises a composite of at least a subset of the respective forward uplink signals.

17. The imaging system of claim 10, wherein the first plurality of forward downlink signals comprises a plurality of forward user data streams for transmission to a plurality of user terminals within the geographical region.

18. The imaging system of claim 10, wherein the first satellite is a geostationary (GEO) satellite and the plurality of second satellites are low earth orbit (LEO) satellites.

* * * * *